US012170395B2

United States Patent
Kim et al.

(10) Patent No.: US 12,170,395 B2
(45) Date of Patent: Dec. 17, 2024

(54) COMBO ANTENNA MODULE AND PORTABLE DEVICE HAVING SAME

(71) Applicant: AMOTECH CO., LTD., Incheon (KR)

(72) Inventors: Seonghyun Kim, Incheon (KR); Hyungil Baek, Incheon (KR); Jooseung Maeng, Incheon (KR); Jinwon Noh, Incheon (KR); Kisang Lim, Incheon (KR); Chungha Back, Incheon (KR); Donghyun Im, Incheon (KR); Jungwon Suk, Incheon (KR); Indeuk Yun, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 207 days.

(21) Appl. No.: 17/787,302

(22) PCT Filed: Dec. 10, 2020

(86) PCT No.: PCT/KR2020/018000
§ 371 (c)(1),
(2) Date: Jun. 18, 2022

(87) PCT Pub. No.: WO2021/125690
PCT Pub. Date: Jun. 24, 2021

(65) Prior Publication Data
US 2023/0017262 A1    Jan. 19, 2023

(30) Foreign Application Priority Data

Dec. 18, 2019  (KR) .................. 10-2019-0170268
Dec. 18, 2019  (KR) .................. 10-2019-0170269
Dec. 18, 2019  (KR) .................. 10-2019-0170270

(51) Int. Cl.
*H01Q 1/22*    (2006.01)
*H01Q 1/24*    (2006.01)
*H01Q 7/06*    (2006.01)

(52) U.S. Cl.
CPC .......... *H01Q 1/2216* (2013.01); *H01Q 1/243* (2013.01); *H01Q 7/06* (2013.01)

(58) Field of Classification Search
CPC ........... H01Q 1/22; H01Q 1/243; H01Q 7/00; H01Q 7/06–08
See application file for complete search history.

(56) References Cited

U.S. PATENT DOCUMENTS 9,673,506 B2  6/2017 Asou et al.
10,608,340 B2  3/2020 Kim et al.
(Continued)

FOREIGN PATENT DOCUMENTS

KR  10-2013-0035879 A  4/2013
KR  10-2014-0102617 A  8/2014
(Continued)

OTHER PUBLICATIONS

Korean Office Action as received in Application No. 10-2019-0170269, Nov. 30, 2021.
(Continued)

*Primary Examiner* — Hasan Islam
(74) *Attorney, Agent, or Firm* — Maschoff Brennan

(57) ABSTRACT

Suggested is a combo antenna module configured to implement the same antenna performance as that of a combo antenna module having a general size, even in a state in which the size thereof is reduced by adjusting, within a set range, a distance at which magnetic sheets disposed on the top and the bottom of an antenna sheet are spaced apart. The suggested combo antenna module comprises: an antenna sheet; a top magnetic sheet disposed on the upper surface of the antenna sheet; and a bottom magnetic sheet disposed on the lower surface of the antenna sheet, wherein the top magnetic sheet includes a projecting region which overlaps with the bottom magnetic sheet while having the antenna (Continued)

sheet therebetween, and the top magnetic sheet and the bottom magnetic sheet are spaced apart at a distance within a set range at a side portion of the projecting region.

12 Claims, 41 Drawing Sheets

(56) References Cited

U.S. PATENT DOCUMENTS

| | | |
|---|---|---|
| 2014/0247547 A1 | 9/2014 | Jung et al. |
| 2014/0306656 A1* | 10/2014 | Tabata ................ H01M 10/44 |
| | | 320/108 |
| 2018/0138580 A1 | 5/2018 | Kim et al. |
| 2018/0277933 A1* | 9/2018 | Kim ........................ H04B 5/26 |
| 2019/0173182 A1* | 6/2019 | Kim ........................ H01Q 1/38 |

FOREIGN PATENT DOCUMENTS

| | | |
|---|---|---|
| KR | 10-1719902 B1 | 3/2017 |
| KR | 10-2018-0055664 A | 5/2018 |
| KR | 10-2022706 B1 | 9/2019 |

OTHER PUBLICATIONS

Korean Office Action as received in Application No. 10-2019-0170268, Mar. 23, 2022.
CN Office Action dated Jan. 15, 2024 as received in Application No. 202080095749.2.

\* cited by examiner

[FIG. 1]
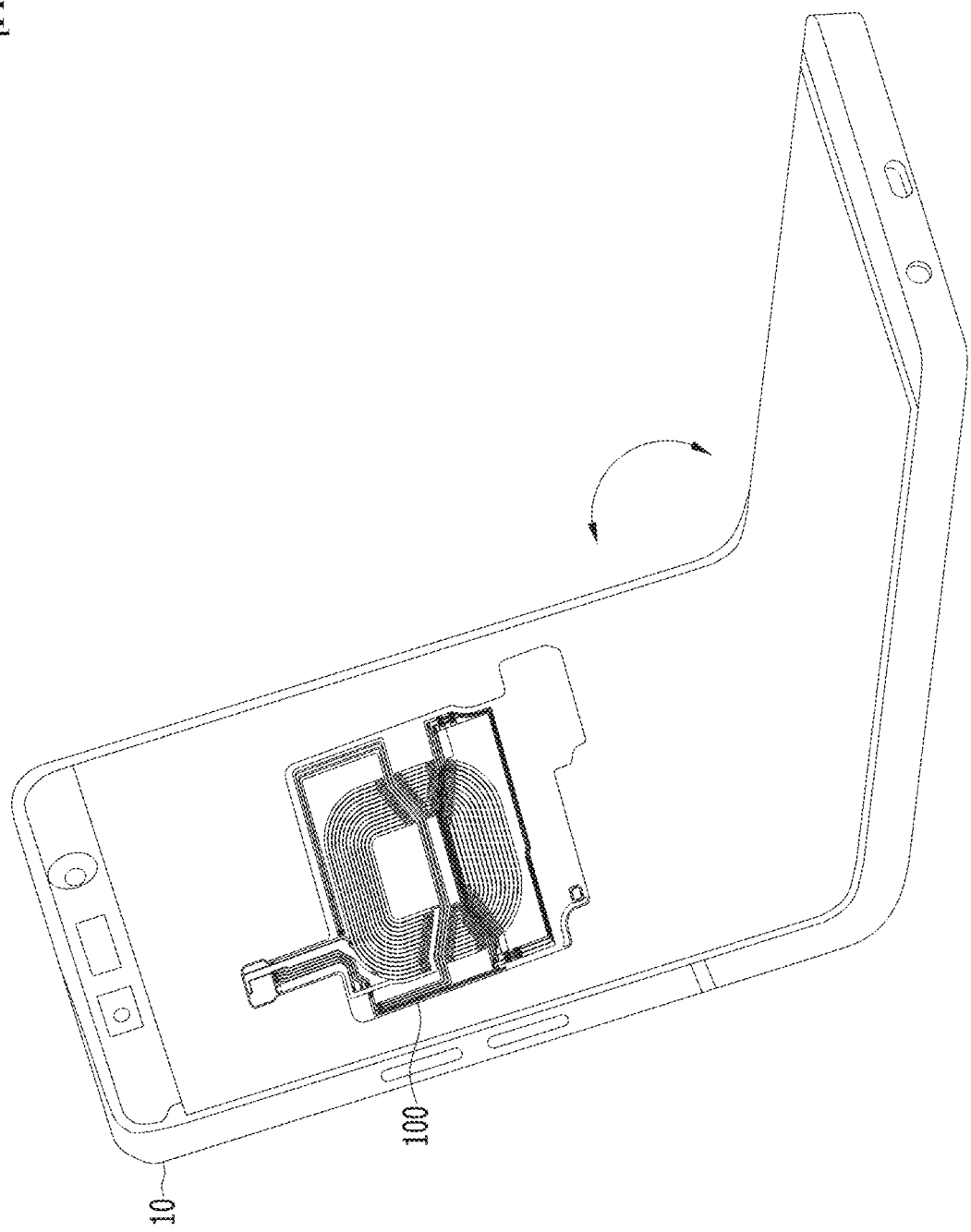

[FIG. 2]
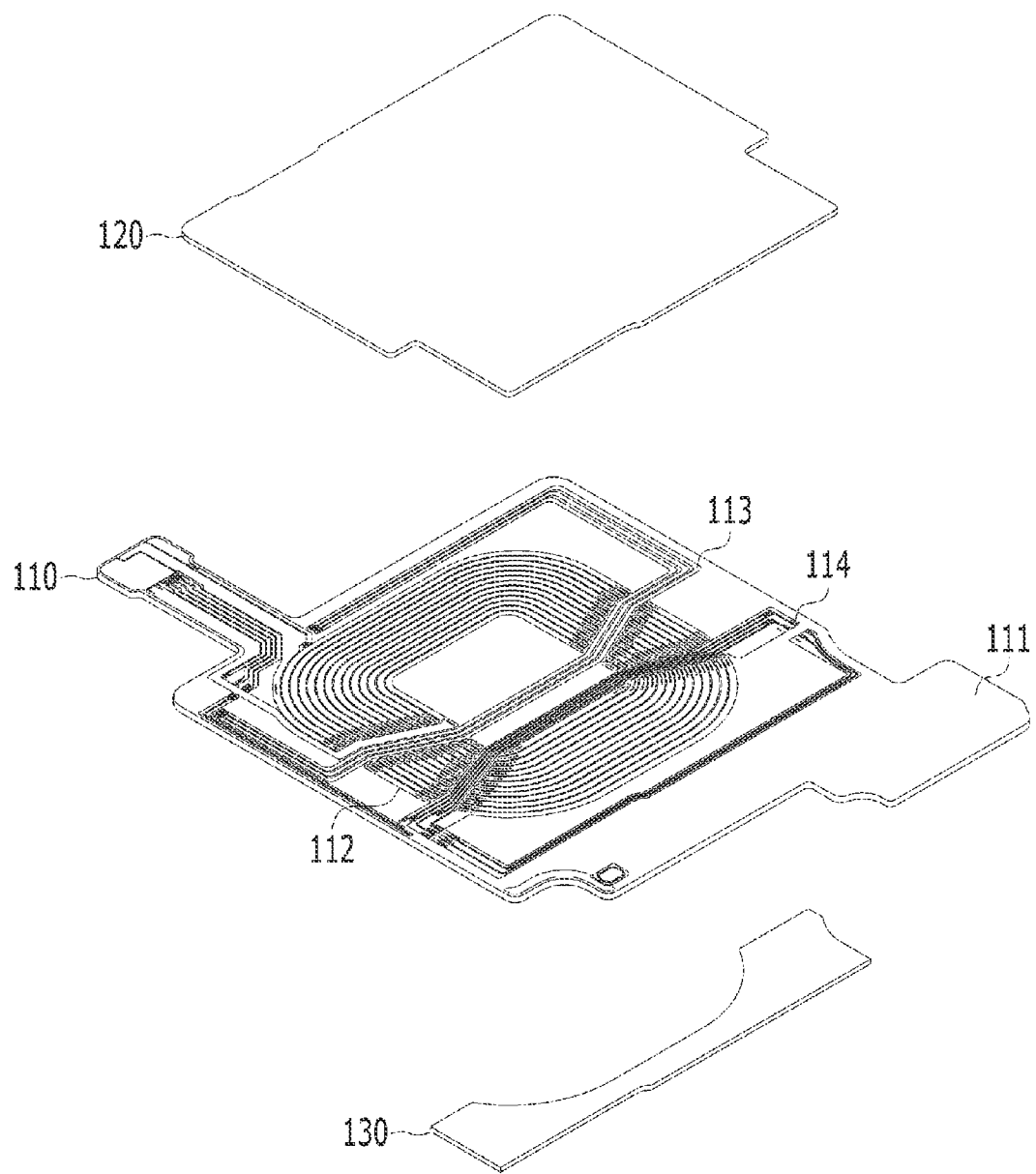

[FIG. 3]
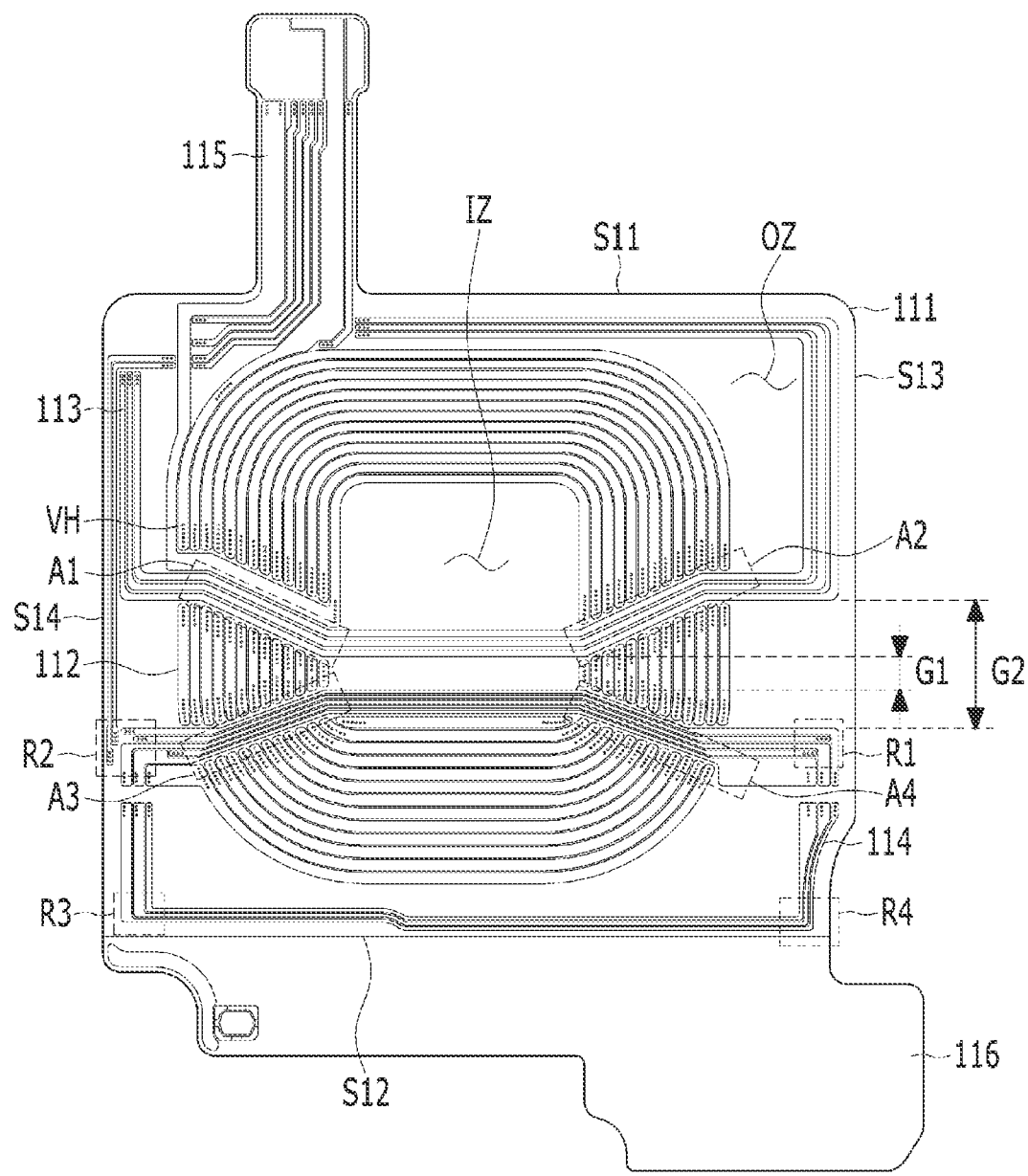

[FIG. 4]
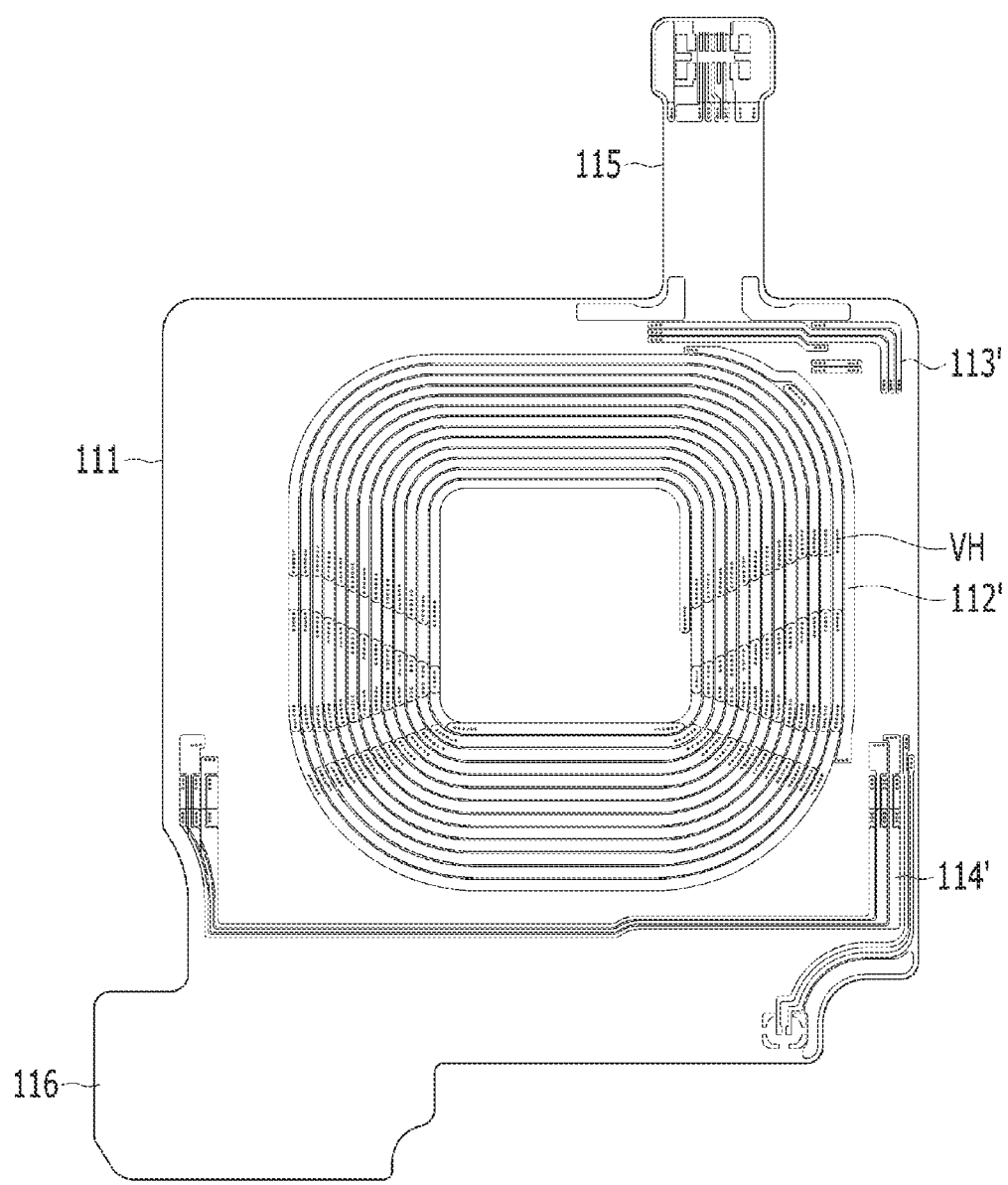

[FIG. 5]
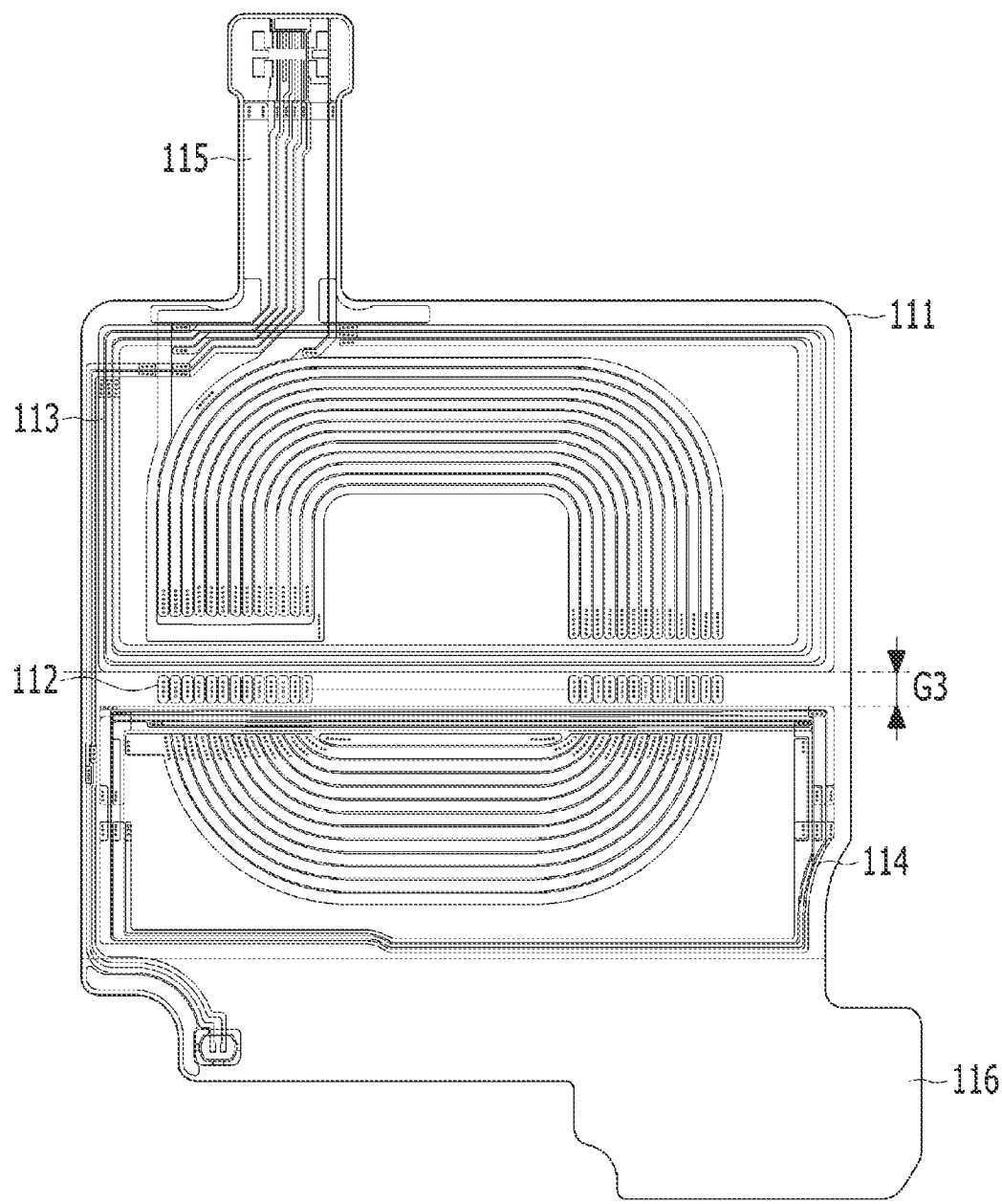

[FIG. 6]
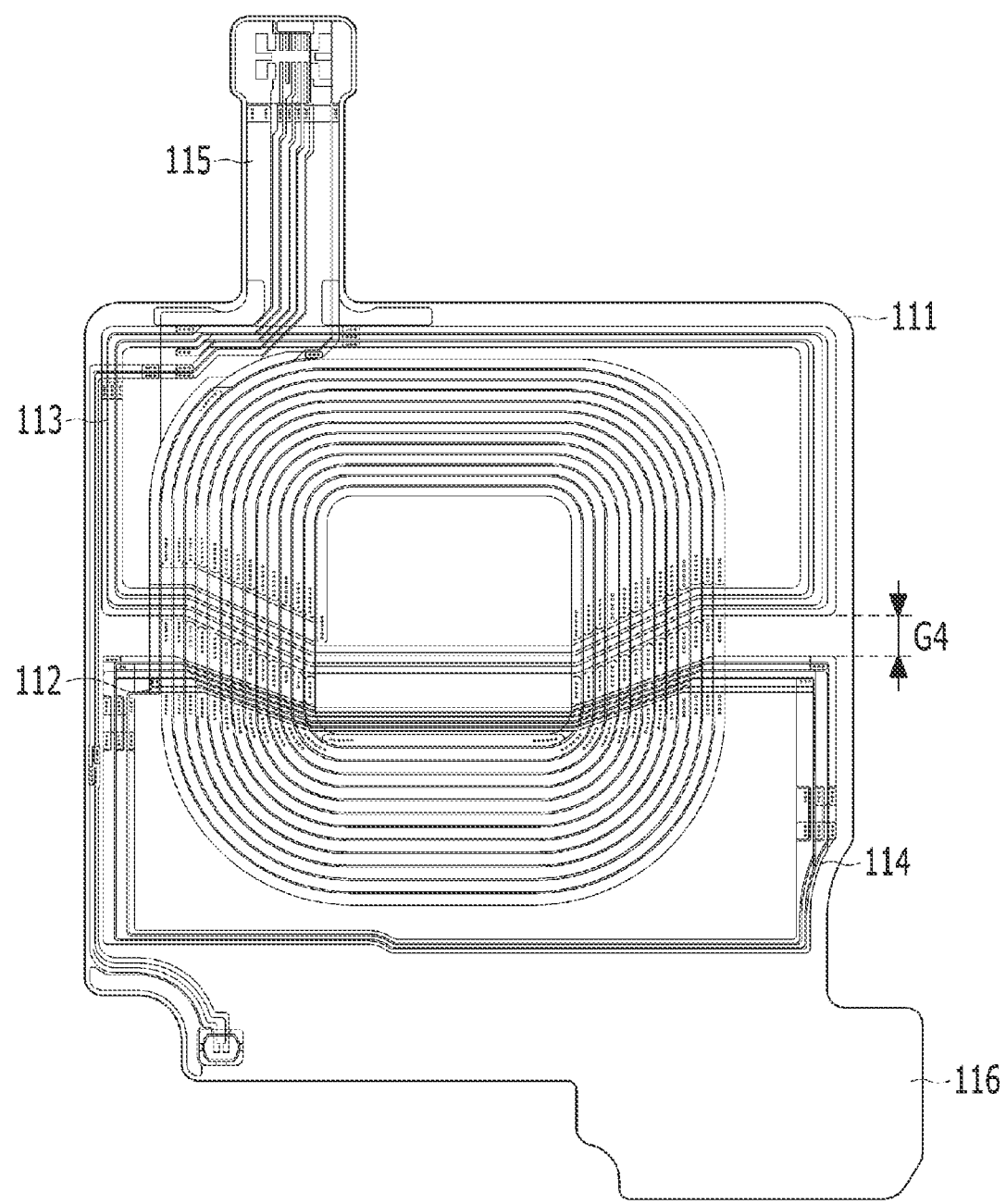

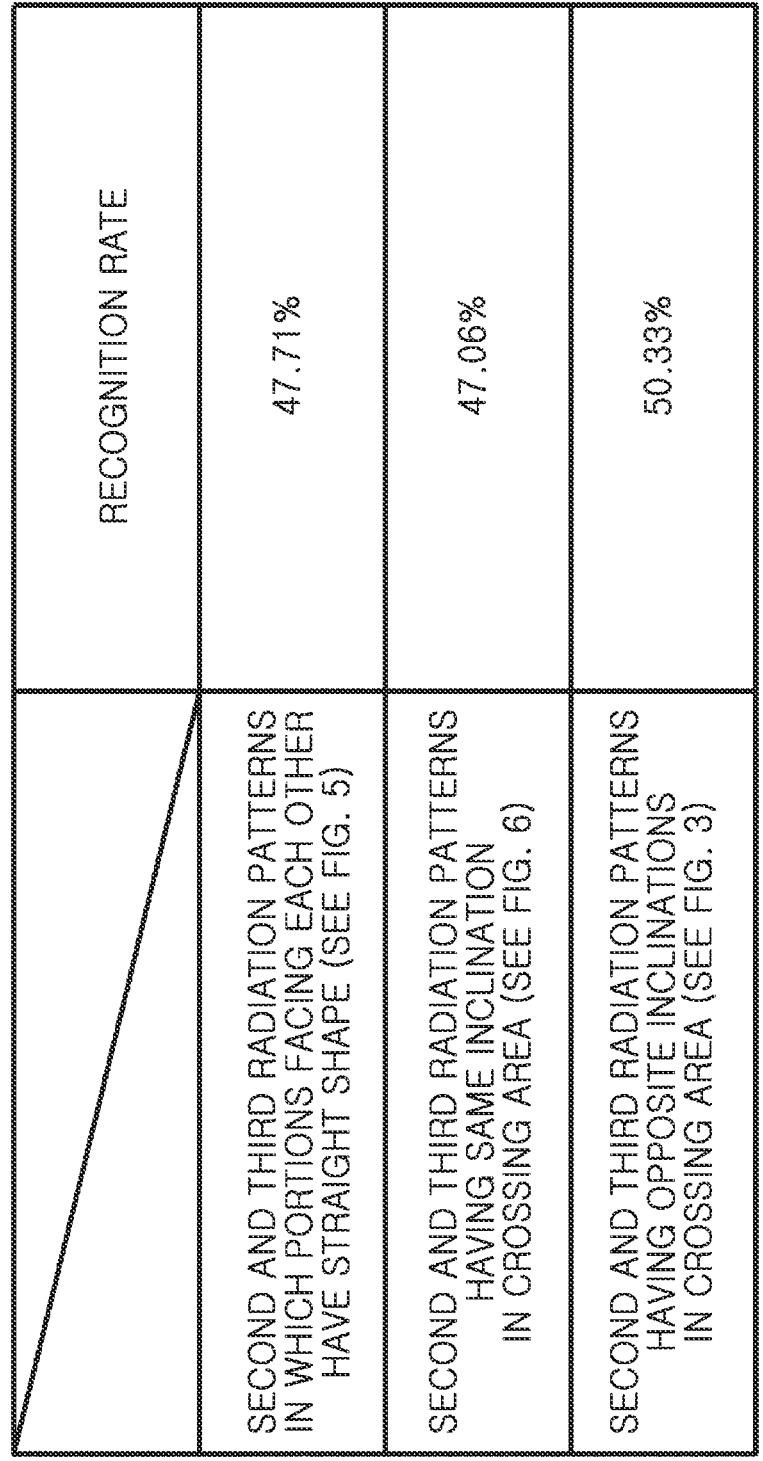
[FIG. 7]

[FIG. 8]

| ACM1252 RECOGNITION DISTANCE (mm) | CARD MODE | | | |
|---|---|---|---|---|
| | LOAD MODULATION (mV) | | | |
| | 0, 0, 0 (8.8mV) | 1, 0, 0 (7.2mV) | 2, 0, 0 (5.6mV) | 3, 0, 0 (4.0mV) |
| SECOND AND THIRD RADIATION PATTERNS IN WHICH PORTIONS FACING EACH OTHER HAVE STRAIGHT SHAPE (SEE FIG. 5) 63 | 31.57 | 19.27 | 22.48 | 21.12 |
| SECOND AND THIRD RADIATION PATTERNS HAVING SAME INCLINATION IN CROSSING AREA (SEE FIG. 6) 60 | 30.77 | 18.36 | 21.52 | 20.11 |
| SECOND AND THIRD RADIATION PATTERNS HAVING OPPOSITE INCLINATIONS IN CROSSING AREA (SEE FIG. 3) 68 | 37.55 | 20.59 | 24.11 | 23.62 |

[FIG. 9]

| SET | READER MODE RECOGNITION DISTANCE (mm) | | | | | | | | |
|---|---|---|---|---|---|---|---|---|---|
| | TYPE 1 | TYPE 2 | | TYPE 4 | TYPE 4 small | TYPE B | | TYPE F | |
| | TOPAZ (Min.20) | ULTRA LIGHT (Min.30) | NTAG203 (Min.15) | ULC (Min.10) | DESFIRE (Min.15) | TECTILES (Min.15) | NETS FLASH (MIN.10) | PROCESS 16.0 (Min.10) | OCTOPUS (Min.20) |
| SECOND AND THIRD RADIATION PATTERNS IN WHICH PORTIONS FACING EACH OTHER HAVE STRAIGHT SHAPE (SEE FIG. 5) | 30 | 37 | 30 | 16 | 17 | 15 | 14 | 15 | 25 |
| SECOND AND THIRD RADIATION PATTERNS HAVING SAME INCLINATION IN CROSSING AREA (SEE FIG. 6) | 29 | 36 | 29 | 15 | 16 | 14 | 13 | 14 | 25 |
| SECOND AND THIRD RADIATION PATTERNS HAVING OPPOSITE INCLINATIONS IN CROSSING AREA (SEE FIG. 3) | 33 | 41 | 32 | 18 | 19 | 19 | 15 | 16 | 30 |

[FIG. 10]
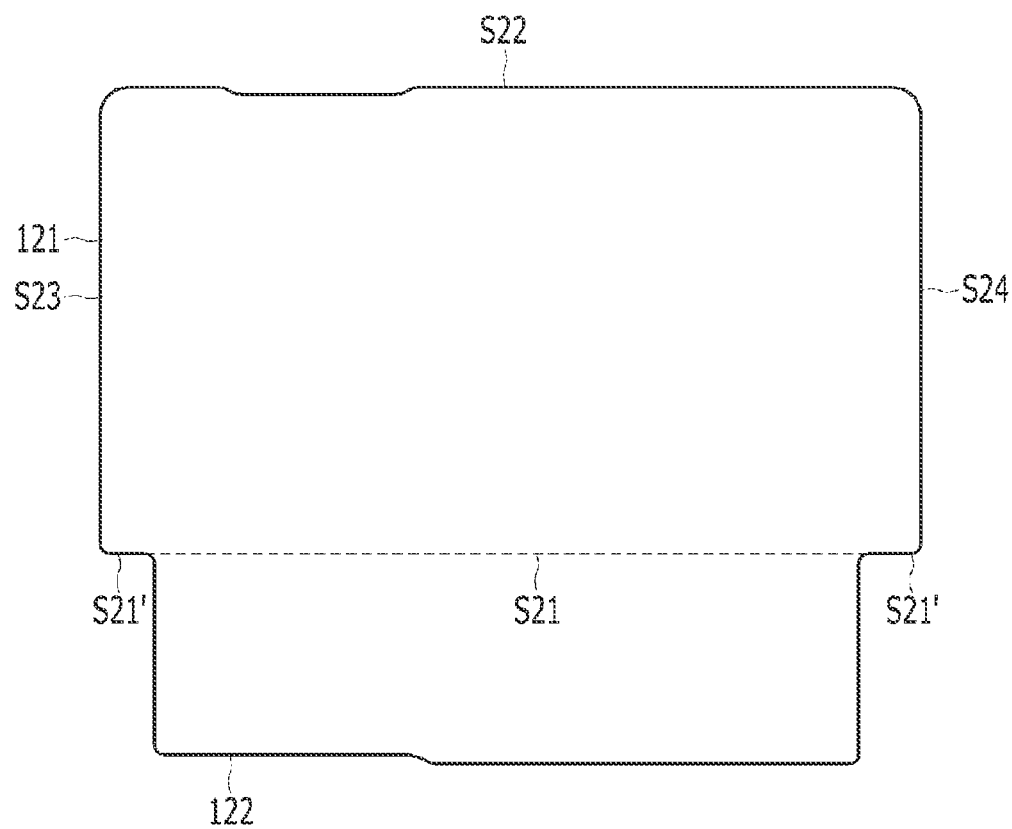
[FIG. 11]
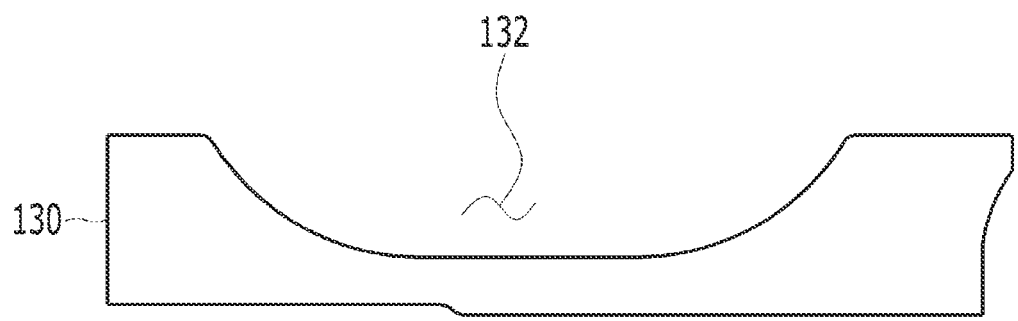

[FIG. 12]
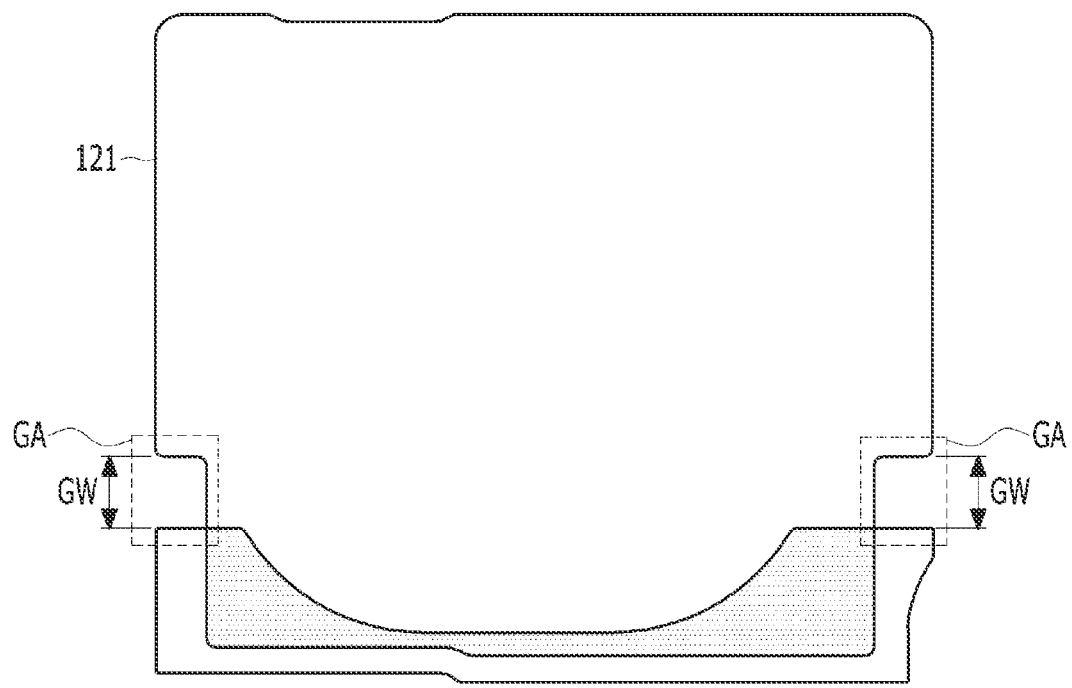

[FIG. 13]
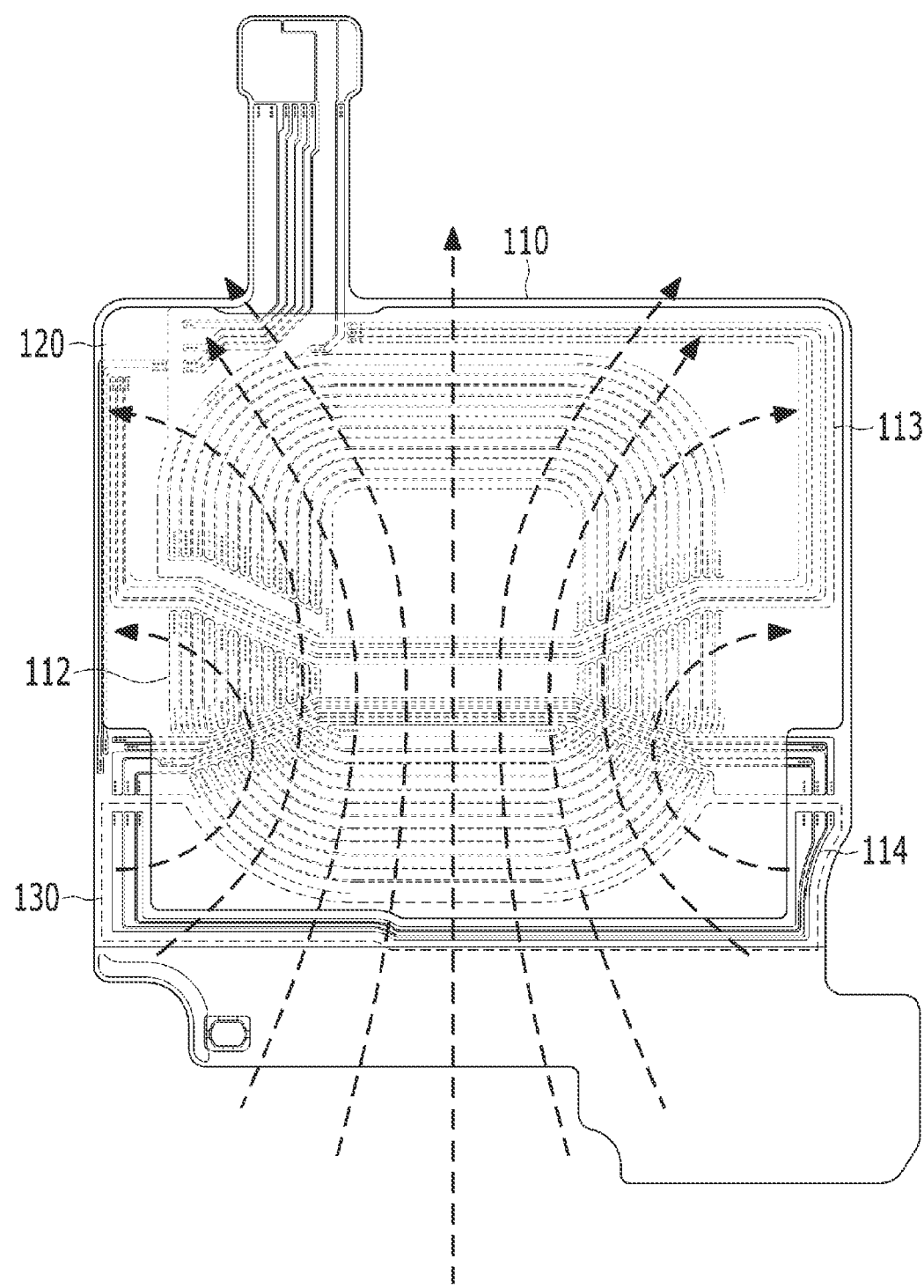

[FIG. 14]
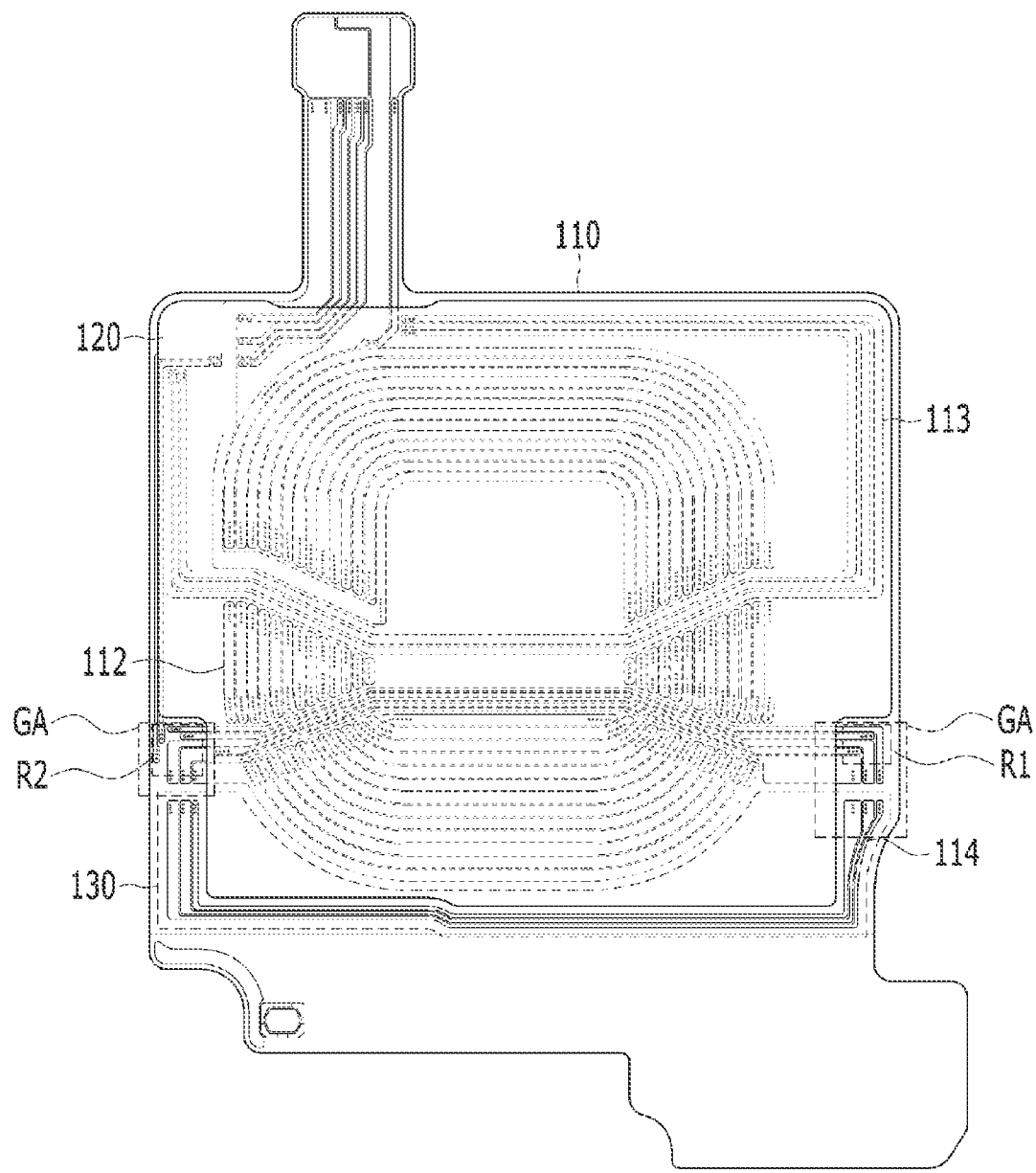

[FIG. 15]

| GAP INTERVAL BETWEEN TOP/BOTTOM MAGNETIC SHEETS | RECOGNITION RATE |
|---|---|
| 2mm | 47.06% |
| 5mm | 50.33% |
| 7mm | 49.67% |
| 9mm | 48.37% |
| 11mm | 47.36% |

[FIG. 16]

| | ACM1252 RECOGNITION DISTANCE (mm) | CARD MODE | | | |
|---|---|---|---|---|---|
| | | LOAD MODULATION (mV) | | | |
| | | 0,0,0 (8.8mV) | 1,0,0 (7.2mV) | 2,0,0 (5.6mV) | 3,0,0 (4.0mV) |
| GAP INTERVAL BETWEEN TOP/BOTTOM MAGNETIC SHEETS 2mm | 67 | 36.41 | 20.15 | 23.99 | 23.74 |
| GAP INTERVAL BETWEEN TOP/BOTTOM MAGNETIC SHEETS 5mm | 68 | 37.55 | 20.59 | 24.11 | 23.62 |
| GAP INTERVAL BETWEEN TOP/BOTTOM MAGNETIC SHEETS 7mm | 68 | 37.44 | 20.28 | 23.89 | 22.75 |
| GAP INTERVAL BETWEEN TOP/BOTTOM MAGNETIC SHEETS 9mm | 67 | 37.01 | 20.17 | 23.44 | 23.51 |
| GAP INTERVAL BETWEEN TOP/BOTTOM MAGNETIC SHEETS 11mm | 68 | 36.98 | 21.00 | 24.87 | 53.05 |

[FIG. 17]

| SET | READER MODE RECOGNITION DISTANCE (mm) | | | | | | | | |
|---|---|---|---|---|---|---|---|---|---|
| | TYPE 1 | TYPE 2 | | TYPE 4 | TYPE 4 SMALL | TYPE B | | TYPE F | |
| | TOPAZ (Min.20) | ULTRA LIGHT (Min.30) | NTAG203 (Min.15) | ULC (Min.10) | DESFIRE EV1 (Min.15) | TECTILES (Min.15) | NETS FLASH (Min.10) | PROCESS 16.0 (Min.10) | OCTOPUS (Min.20) |
| GAP INTERVAL BETWEEN TOP/BOTTOM MAGNETIC SHEETS 2mm | 33 | 40 | 32 | 18 | 19 | 19 | 15 | 16 | 29 |
| GAP INTERVAL BETWEEN TOP/BOTTOM MAGNETIC SHEETS 5mm | 33 | 41 | 32 | 18 | 19 | 19 | 15 | 16 | 30 |
| GAP INTERVAL BETWEEN TOP/BOTTOM MAGNETIC SHEETS 7mm | 33 | 41 | 31 | 18 | 19 | 19 | 15 | 16 | 30 |
| GAP INTERVAL BETWEEN TOP/BOTTOM MAGNETIC SHEETS 9mm | 32 | 41 | 32 | 18 | 19 | 19 | 15 | 16 | 30 |
| GAP INTERVAL BETWEEN TOP/BOTTOM MAGNETIC SHEETS 11mm | 33 | 40 | 32 | 18 | 19 | 19 | 15 | 15 | 30 |

[FIG. 18]
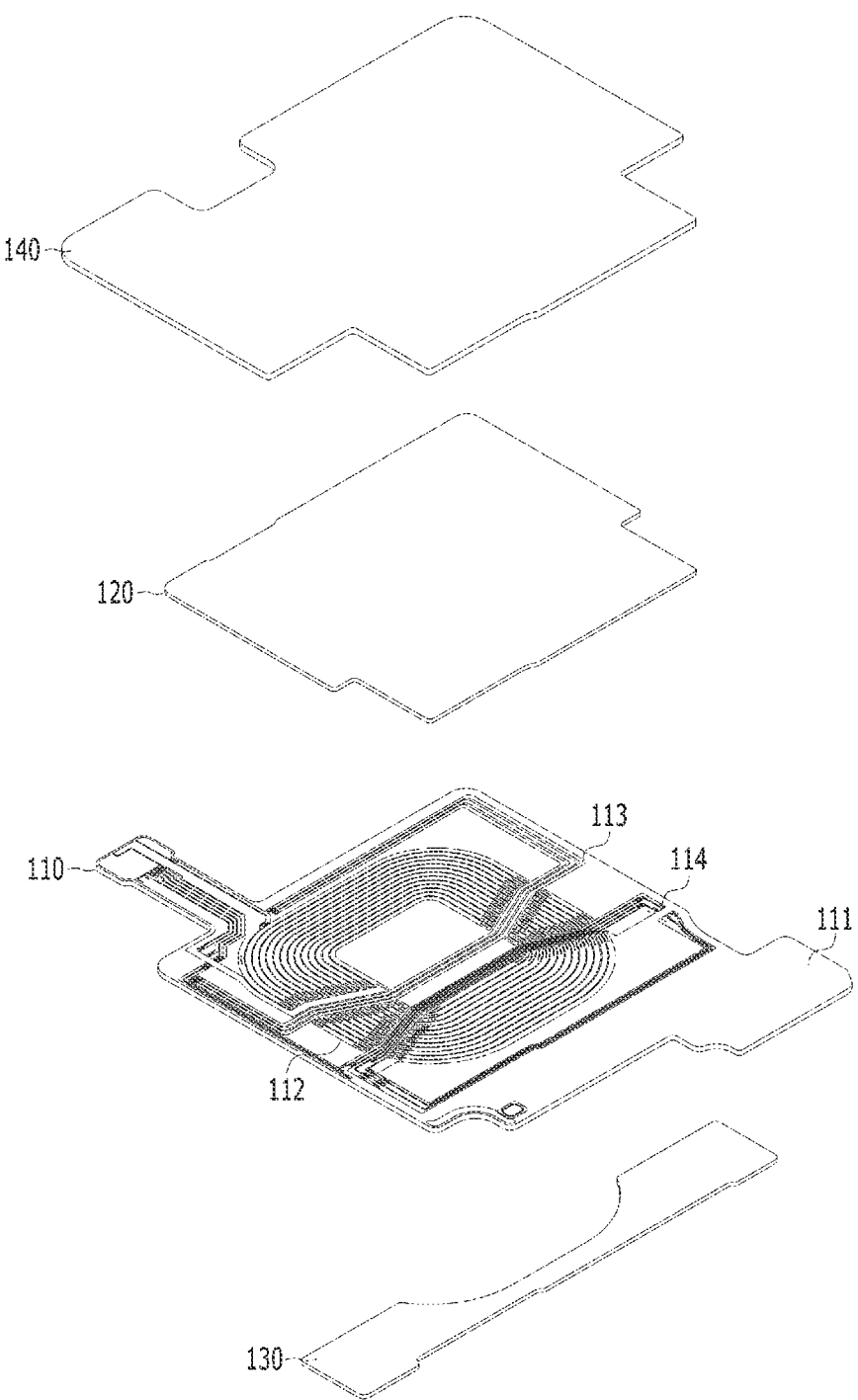

[FIG. 19]
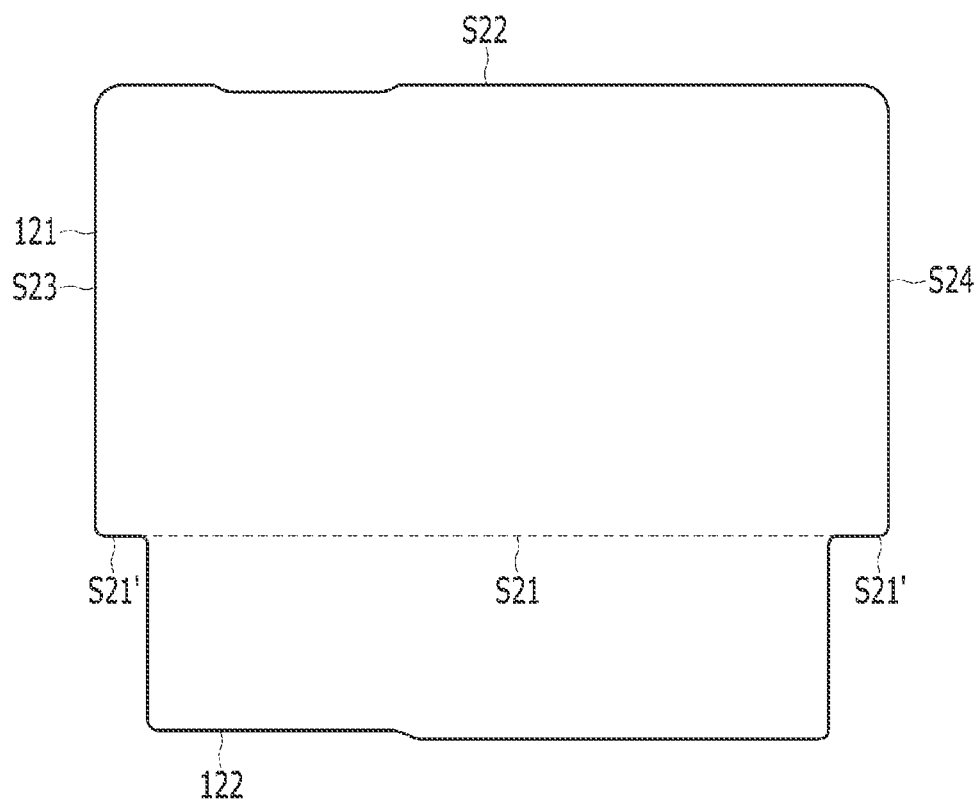
[FIG. 20]
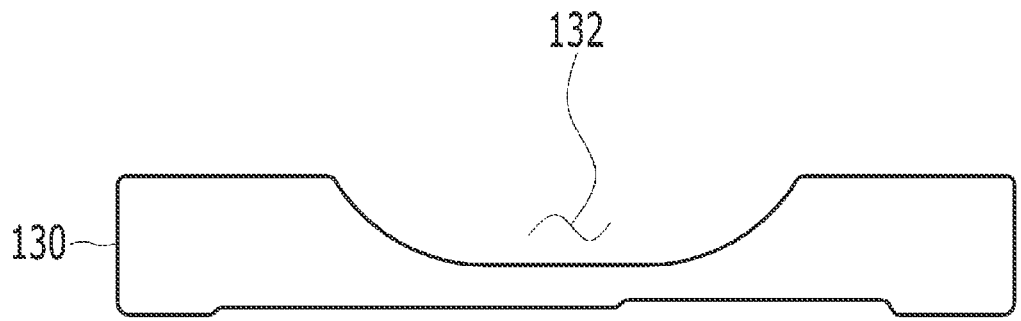

[FIG. 21]
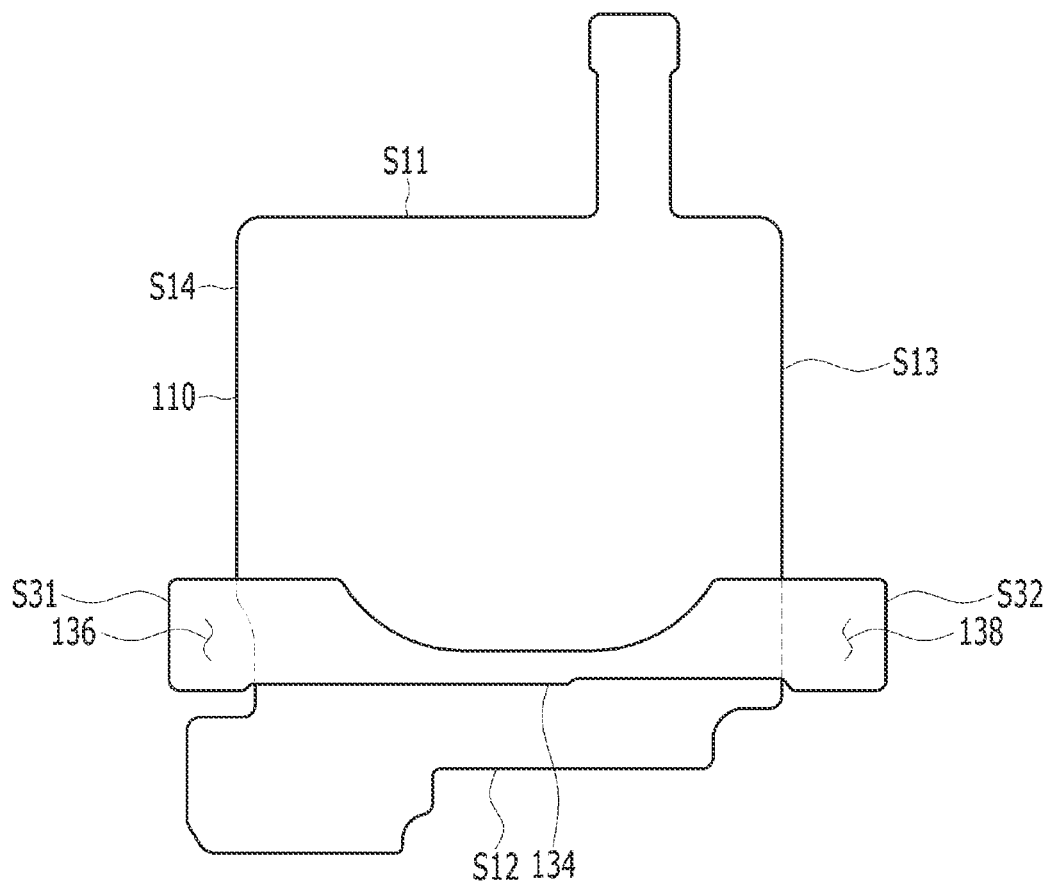

[FIG. 22]
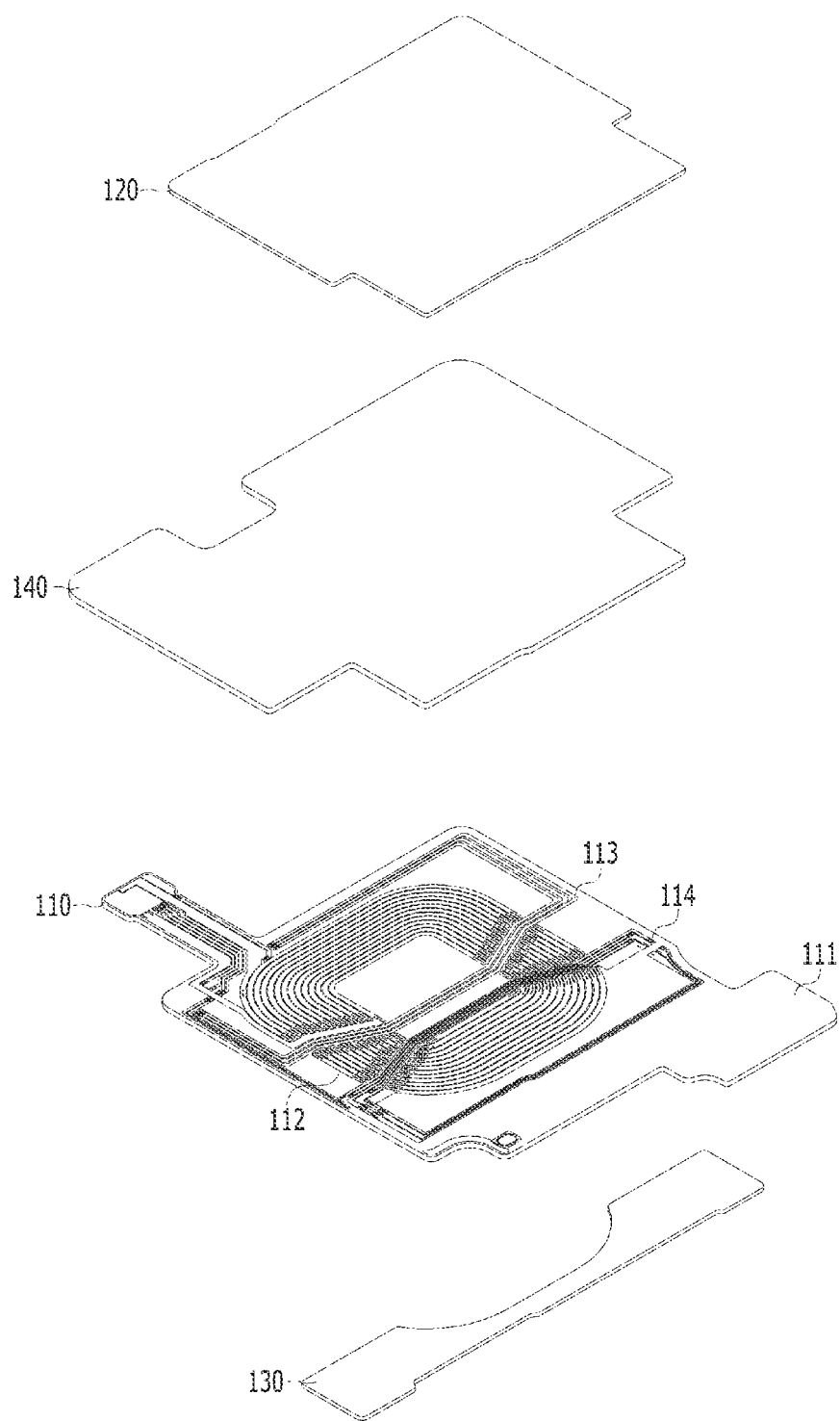

[FIG. 23]
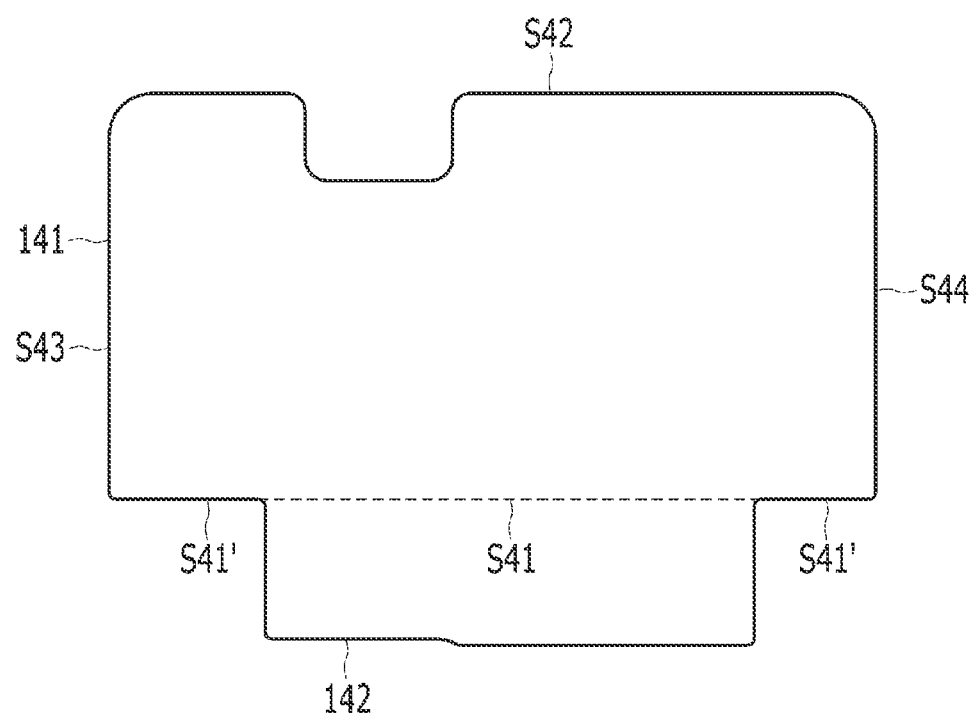

[FIG. 24]
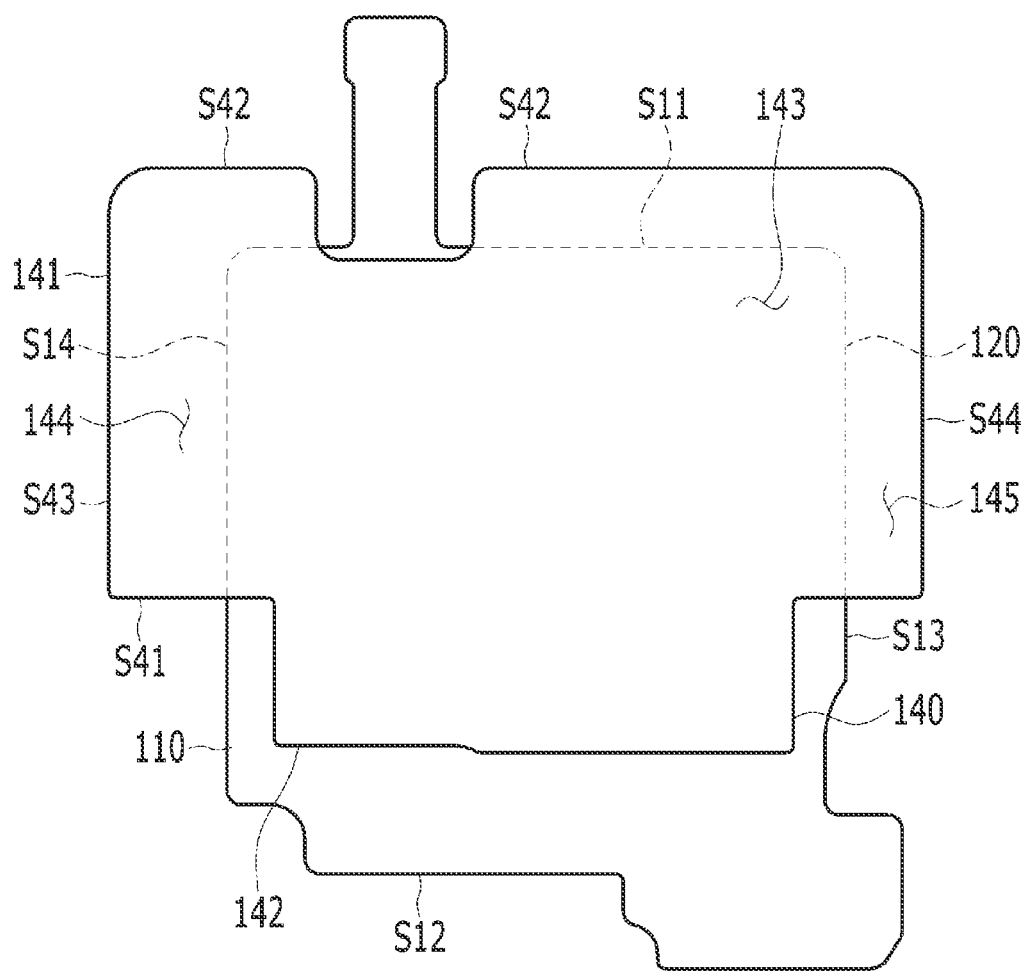

[FIG. 25]
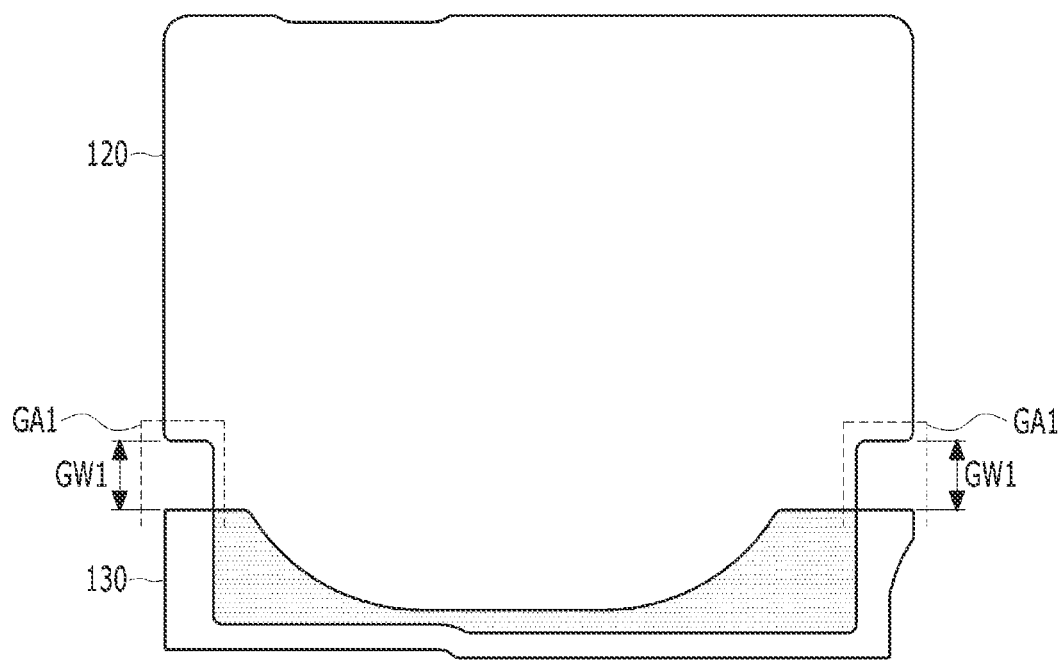
[FIG. 26]
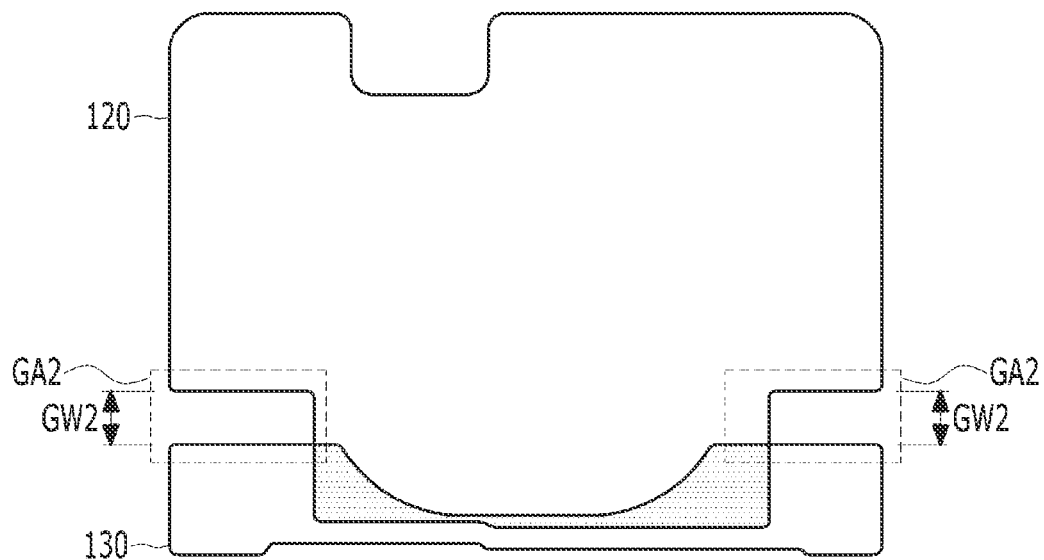

[FIG. 27]
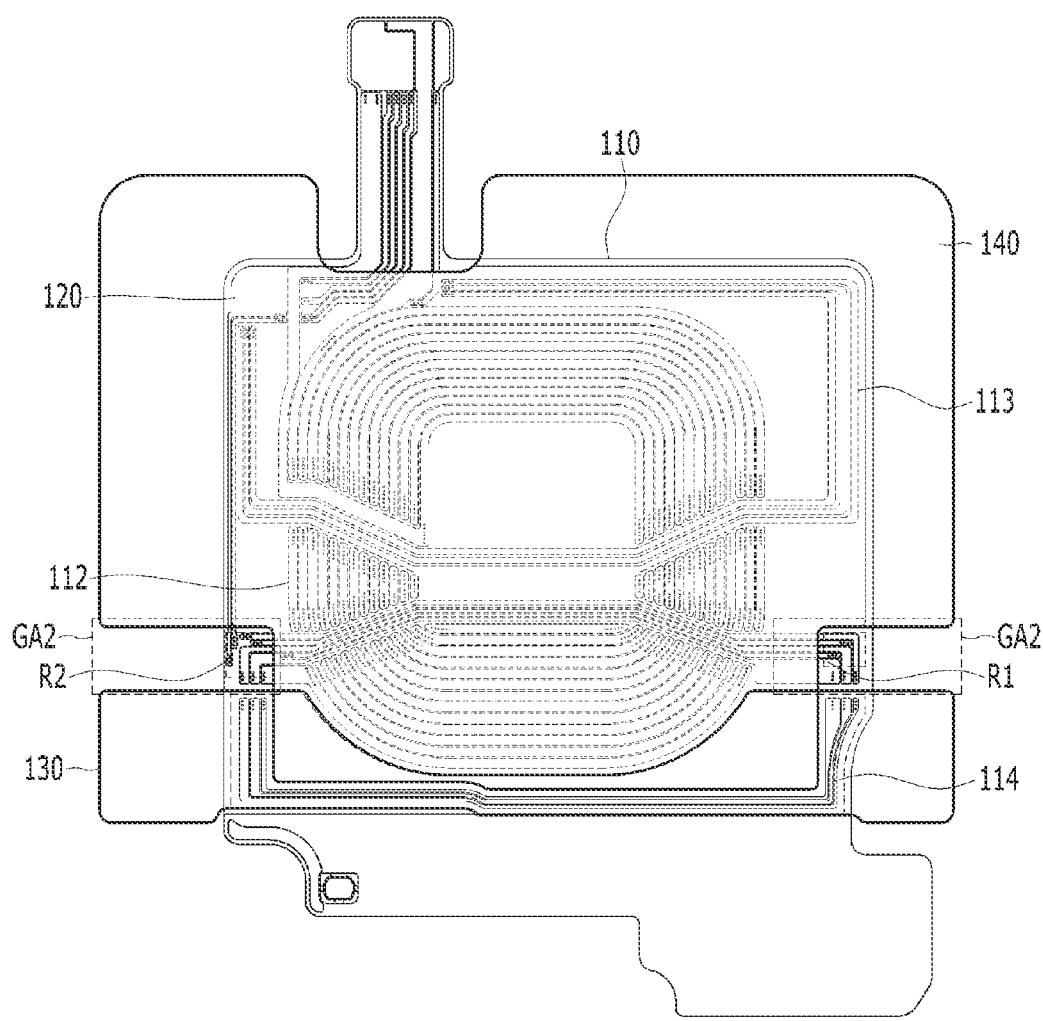

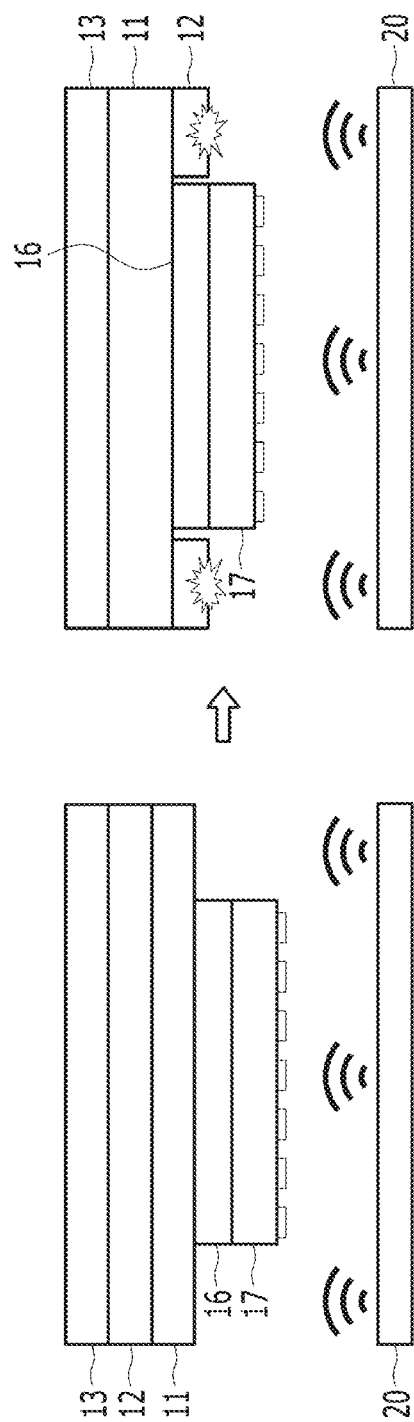
[FIG. 28]

[FIG. 29]
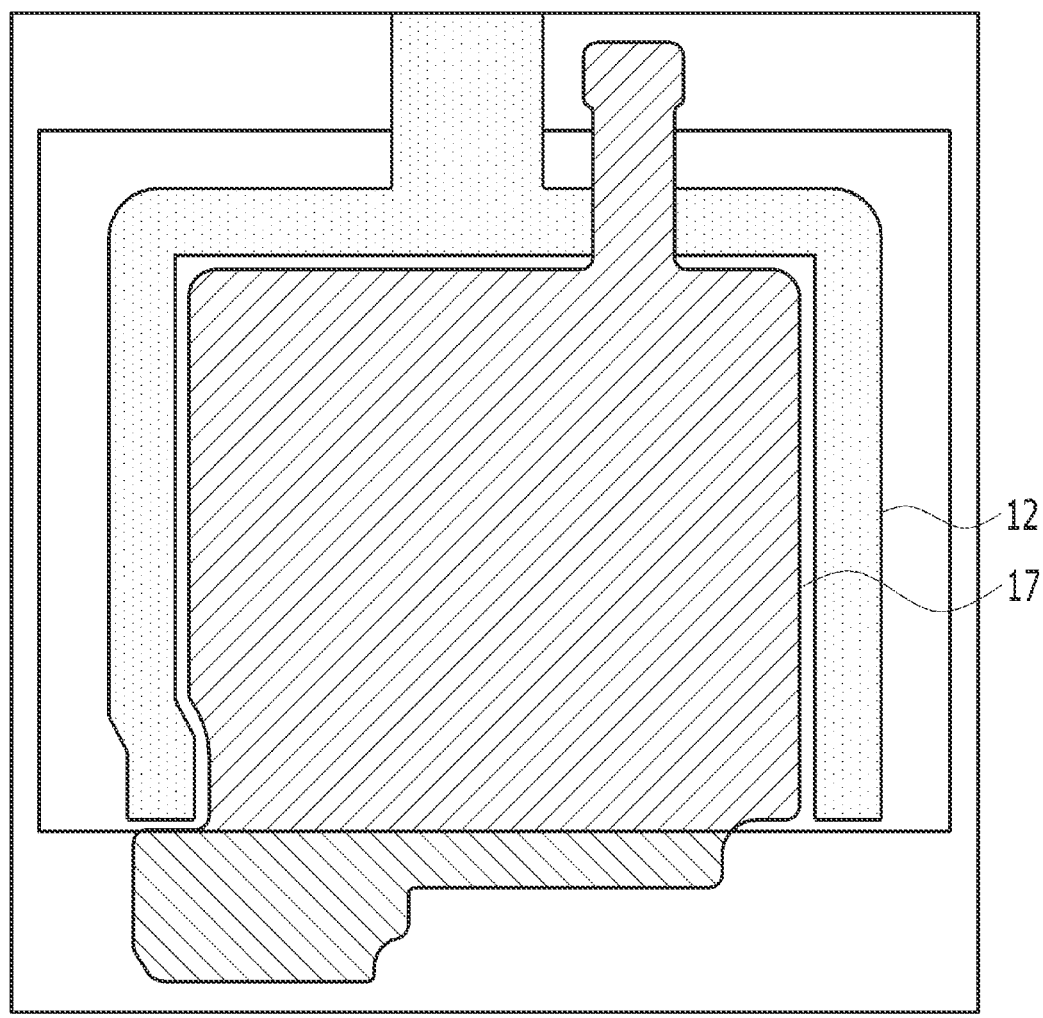

[FIG. 30]
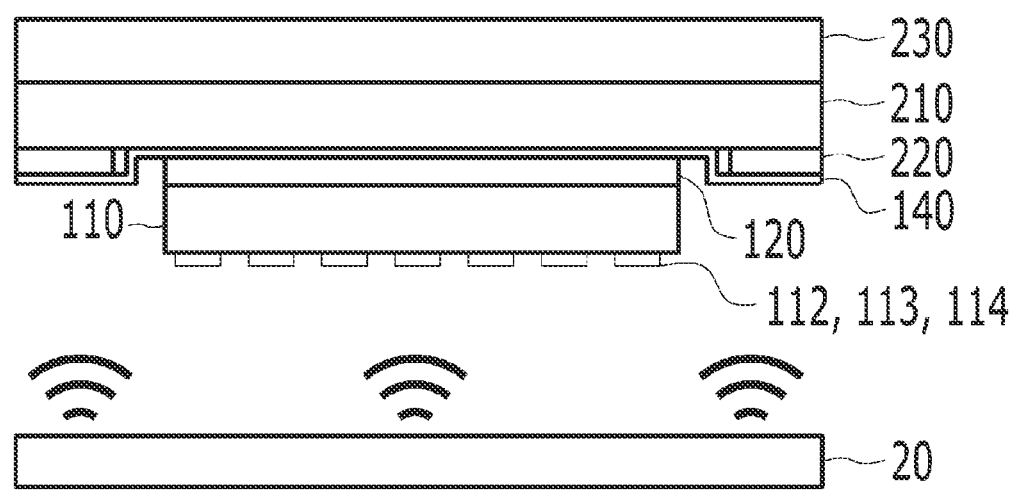

[FIG. 31]
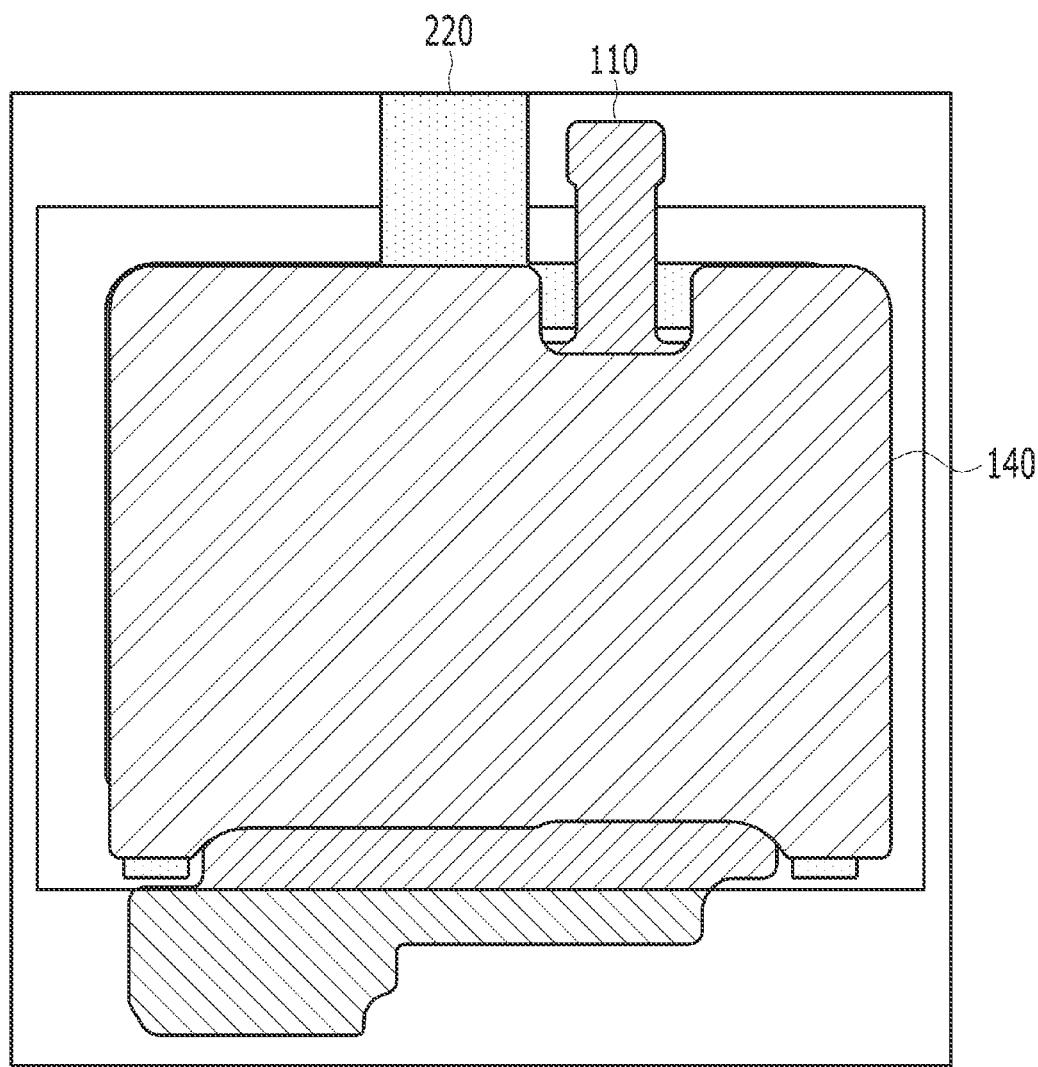

[FIG. 32]
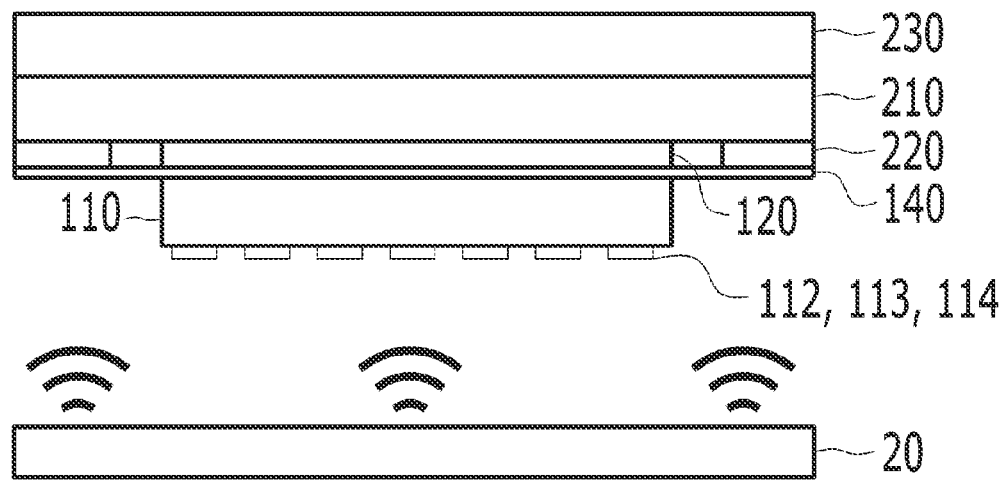
[FIG. 33]
| | RECOGNITION RATE |
|---|---|
| GAP STRUCTURE OF MAGNETIC SHEET | 50.33 % |
| EXPANSION STRUCTURE OF MAGNETIC SHEET | 54.90 % |

[FIG. 34]

| | ACM1252 RECOGNITION DISTANCE (mm) | CARD MODE | | | |
|---|---|---|---|---|---|
| | | LOAD MODULATION (mV) | | | |
| | | 0.0.0 (8.8mV) | 1.0.0 (7.2mV) | 2.0.0 (5.6mV) | 3.0.0 (4.0mV) |
| GAP STRUCTURE OF MAGNETIC SHEET | 68 | 37.55 | 20.59 | 24.11 | 23.62 |
| EXPANSION STRUCTURE OF MAGNETIC SHEET | 70 | 38.69 | 20.83 | 25.19 | 23.86 |

[FIG. 35]

| | TYPE 1 | | TYPE 2 | | TYPE 4 | TYPE 4 SMALL | TYPE B | | TYPE F |
|---|---|---|---|---|---|---|---|---|---|
| | TOPAZ (Min.20) | ULTRA LIGHT (Min.30) | NTAG203 (Min.15) | ULC (Min.10) | DESFIRE EV1 (Min.15) | TECTILES (Min.15) | NETS FLASH (Min.10) | PROCESS 16.0 (Min.10) | OCTOPUS (Min.20) |
| GAP STRUCTURE OF MAGNETIC SHEET | 33 | 41 | 32 | 18 | 19 | 19 | 15 | 16 | 30 |
| EXPANSION STRUCTURE OF MAGNETIC SHEET | 34 | 42 | 35 | 20 | 21 | 21 | 15 | 17 | 31 |

READER MODE RECOGNITION DISTANCE (mm)

[FIG. 36]
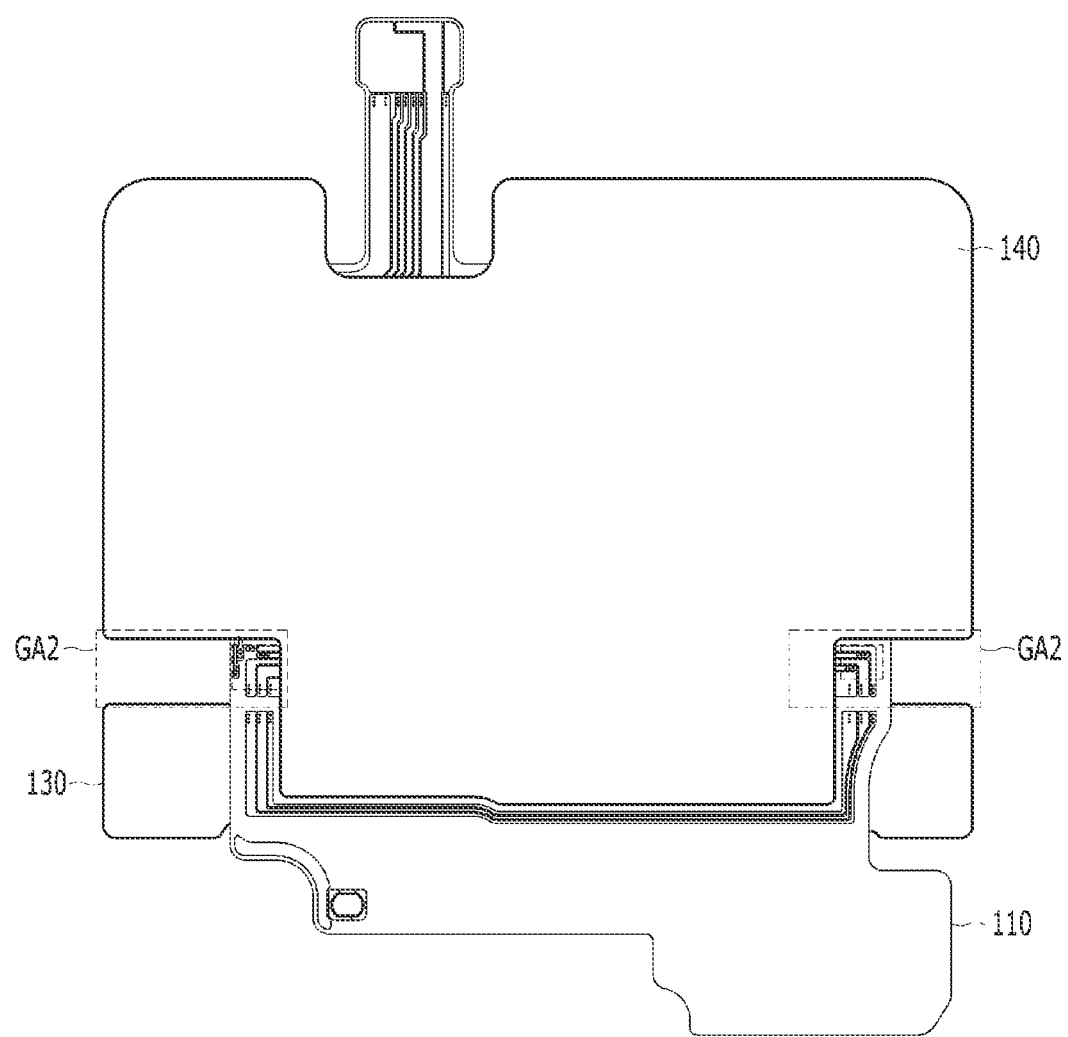

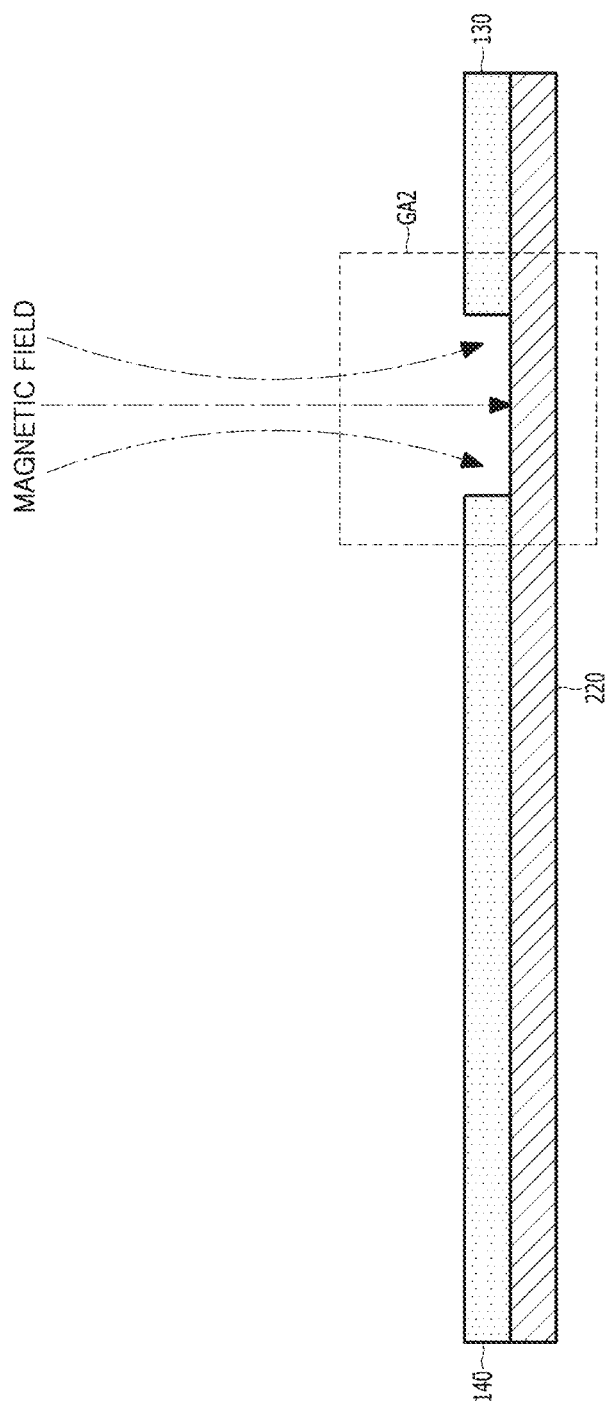

[FIG. 38]
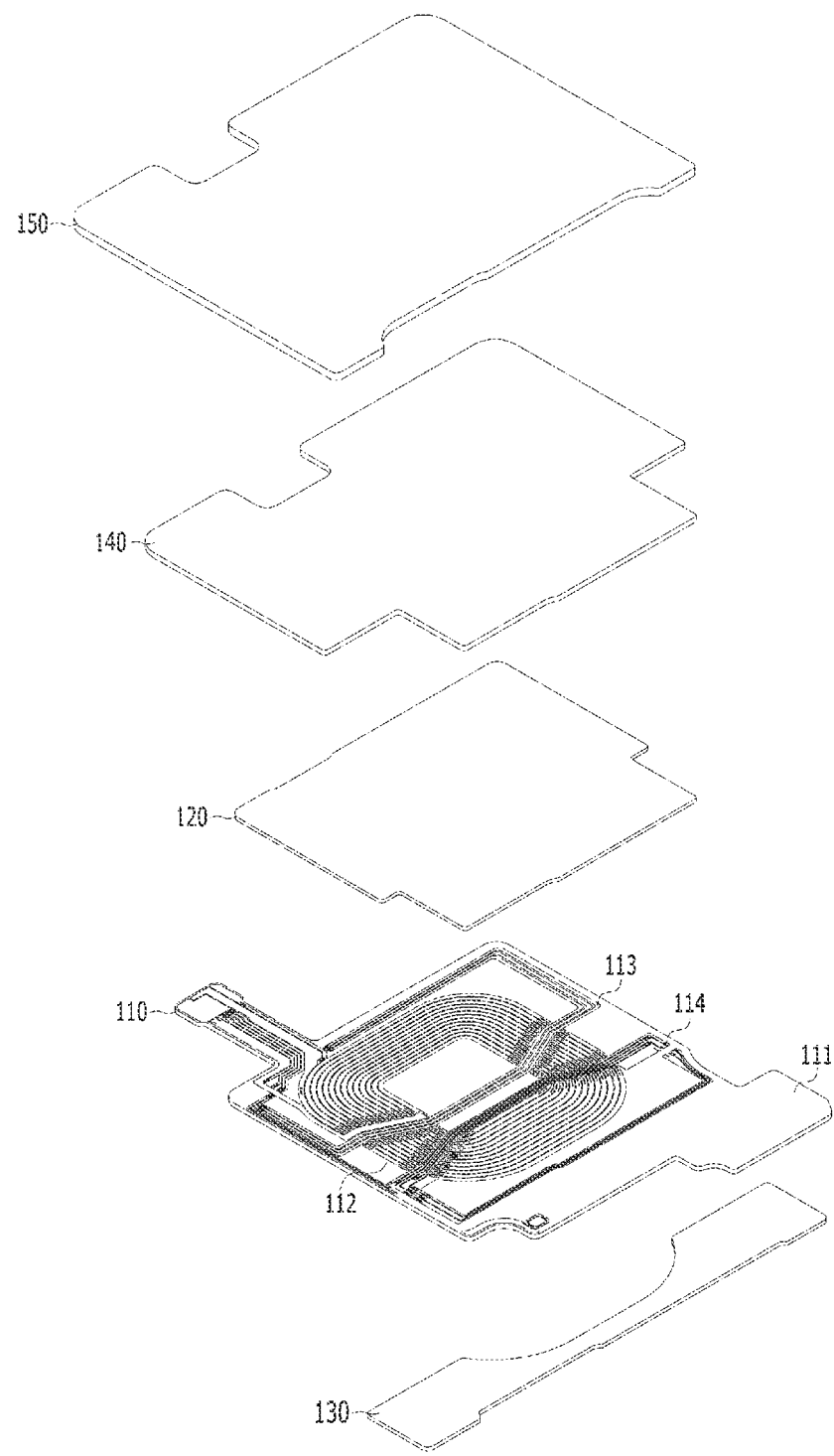

[FIG. 39]
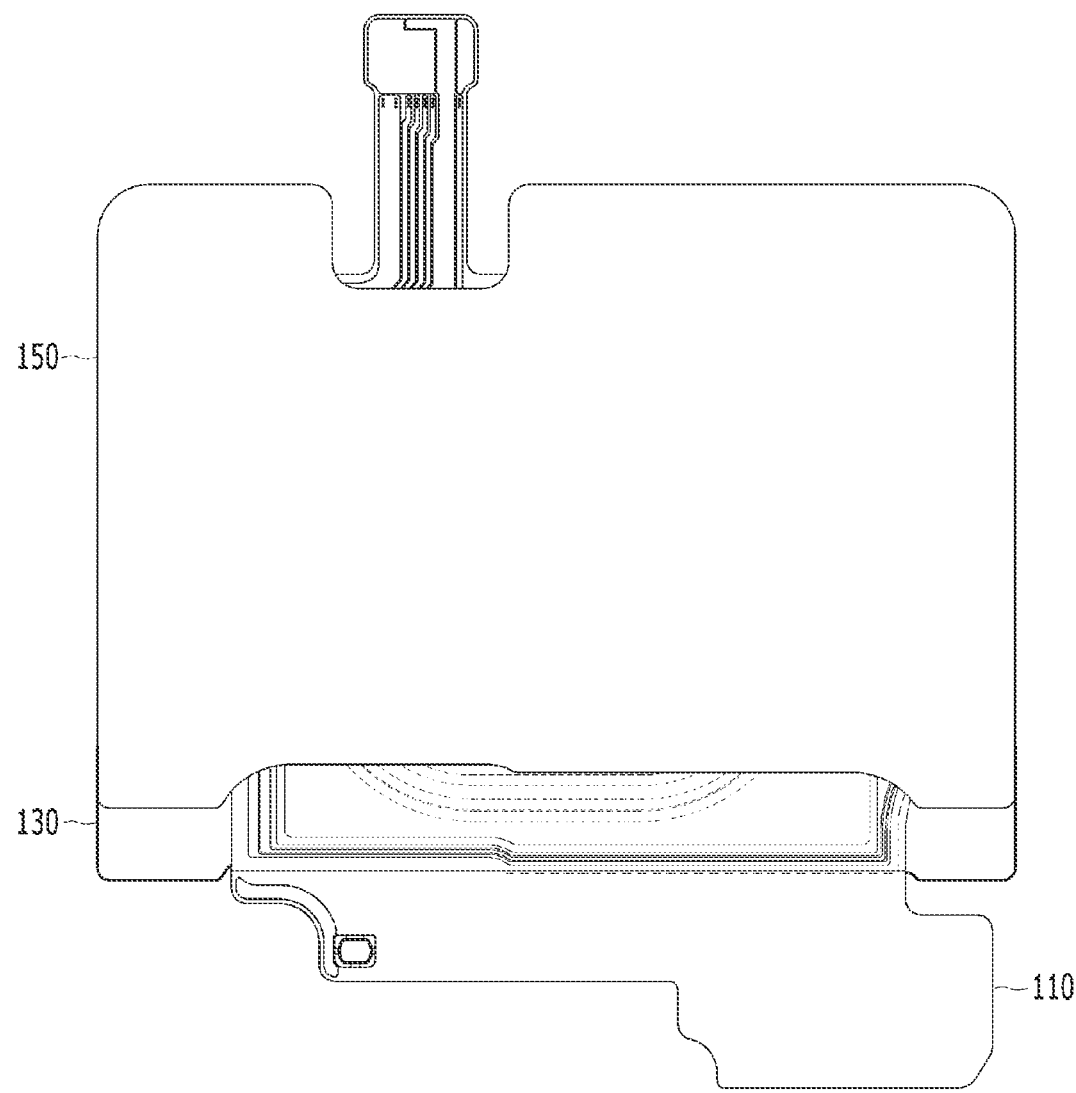

[FIG. 40]
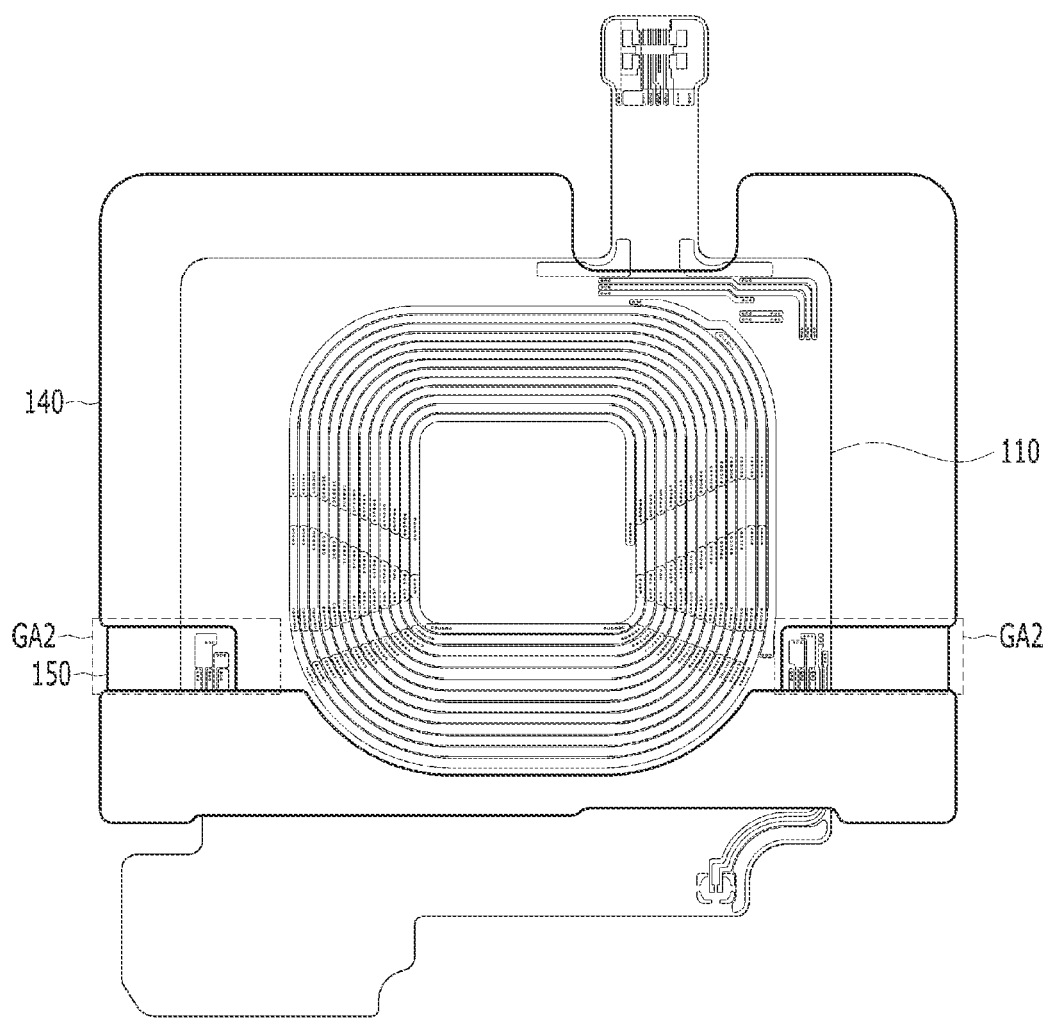

[FIG. 41]
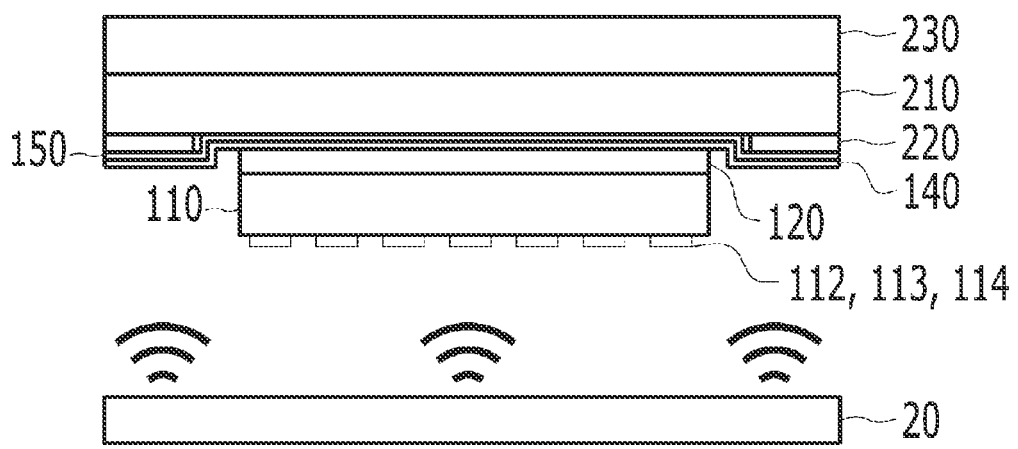

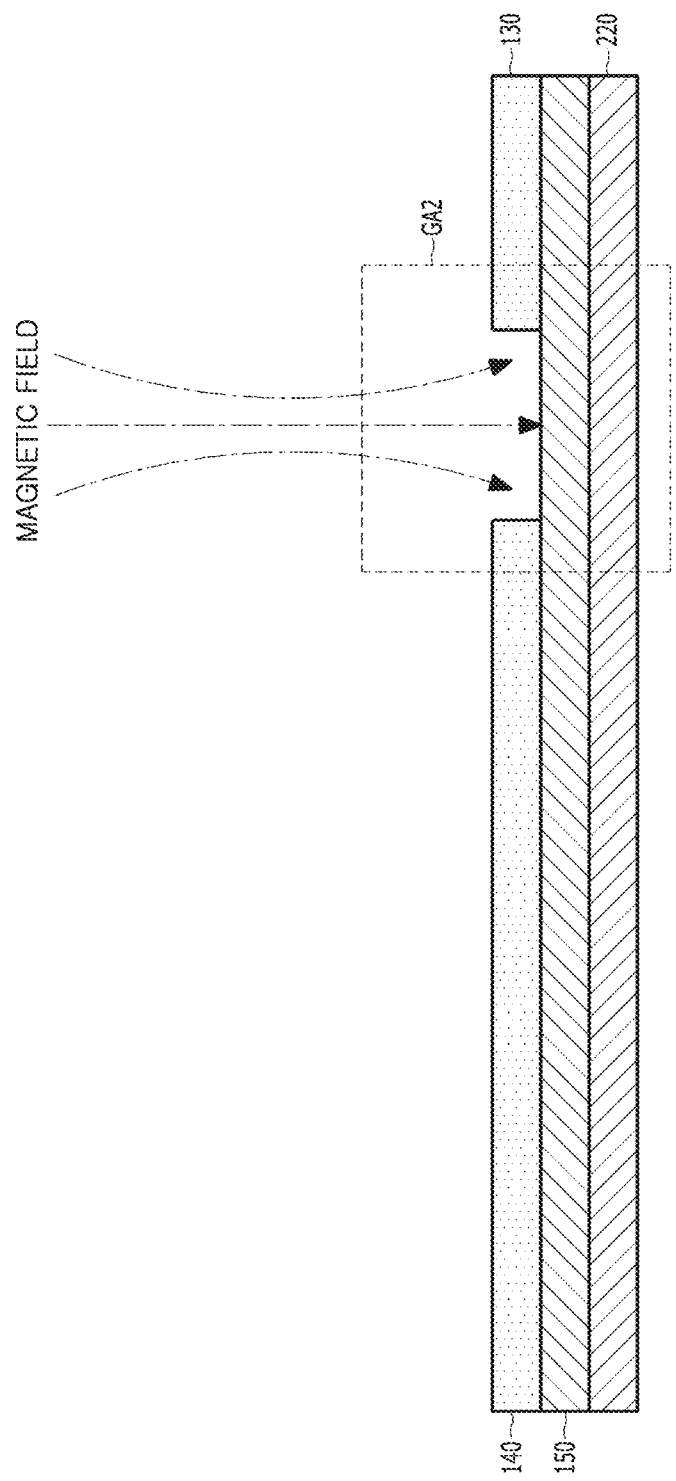

[FIG. 43]

| | RECOGNITION RATE |
|---|---|
| FIRST EMBODIMENT OF PRESENT DISCLOSURE (EXPANSION STRUCTURE OF MAGNETIC SHEET) | 54.90 % |
| SECOND EMBODIMENT OF PRESENT DISCLOSURE (SHIELDING STRUCTURE OF METAL SHEET) | 54.90 % |

[FIG. 44]

| | ACM1252 RECOGNITION DISTANCE (mm) | CARD MODE | | | |
|---|---|---|---|---|---|
| | | LOAD MODULATION (mV) | | | |
| | | 0,0,0 (8.8mV) | 1,0,0 (7.2mV) | 2,0,0 (5.6mV) | 3,0,0 (4.0mV) |
| FIRST EMBODIMENT OF PRESENT DISCLOSURE (EXPANSION STRUCTURE OF MAGNETIC SHEET) | 70 | 38.69 | 20.83 | 25.19 | 23.86 |
| SECOND EMBODIMENT OF PRESENT DISCLOSURE (SHIELDING STRUCTURE OF METAL SHEET) | 70 | 37.62 | 20.66 | 24.18 | 23.69 |

[FIG. 45]

| | TYPE 1 | | TYPE 2 | | TYPE 4 | TYPE 4 SMALL | TYPE B | | TYPE F |
|---|---|---|---|---|---|---|---|---|---|
| | TOPAZ (Min.20) | ULTRA LIGHT (Min.30) | NTAG203 (Min.15) | ULC (Min.10) | DESFIRE EV1 (Min.15) | TECTILES (Min.15) | NETS FLASH (Min.10) | PROCESS 16.0 (Min.10) | OCTOPUS (Min.20) |
| FIRST EMBODIMENT OF PRESENT DISCLOSURE (EXPANSION STRUCTURE OF MAGNETIC SHEET) | 34 | 42 | 35 | 20 | 21 | 21 | 15 | 17 | 31 |
| SECOND EMBODIMENT OF PRESENT DISCLOSURE (SHIELDING STRUCTURE OF METAL SHEET) | 34 | 42 | 35 | 20 | 21 | 21 | 15 | 17 | 31 |

READER MODE RECOGNITION DISTANCE (mm)

COMBO ANTENNA MODULE AND PORTABLE DEVICE HAVING SAME

TECHNICAL FIELD

The present disclosure relates to a combo antenna module and a portable device having the same, and more specifically, to a combo antenna module mounted in a portable device and the portable device having the same.

BACKGROUND ART

A portable device provides various functions such as short-range communication, wireless charging, and electronic payment. Various antennas such as an NFC antenna, a WPC antenna, and an MST antenna are mounted in the portable device to provide various functions.

As various antennas are mounted in the portable device, a mounting space is always insufficient. As the portable device becomes smaller and thinner, and a battery size increases due to an increase in battery capacity, the shortage phenomenon of the mounting space is further exacerbated.

In the antenna industry, research is being conducted to reduce the size of the antenna in order to solve the shortage phenomenon of the mounting space for the portable device. When the size of the antenna decreases, an area in which a radiation pattern is mounted decreases, and interference between radiation patterns of different frequency bands occurs. The decrease in the area and the occurrence of the interference are the main causes of degradation in antenna performance.

A combo antenna module is an antenna in which a plurality of antennas (radiation patterns) having different frequency bands, such as an NFC antenna, a WPC antenna, and an MST antenna, are formed into one module (or board), and is mainly used to solve the phenomenon of insufficient mounting space.

Recently, as portable devices smaller and thinner than conventional portable devices, such as wearable devices and foldable phones, have been developed, the development of a combo antenna module having a smaller size and having an antenna performance greater than or equal to that of the conventional one is required.

SUMMARY OF INVENTION

Technical Problem

The present disclosure has been proposed in consideration of the above situation, and an object of the present disclosure is to provide a combo antenna module, which implements the same antenna performance as that of a general combo antenna module even in a state in which the size is reduced by adjusting a gap interval between magnetic sheets disposed on each of the top and bottom of an antenna sheet within a set range.

In addition, the present disclosure has been proposed in consideration of the above situation, another object of the present disclosure is to provide a combo antenna module, which prevents the occurrence of noise upon wireless power transmission by expanding an expansion magnetic sheet to dispose the expansion magnetic sheet below a connector cable of a portable device, and the portable device having the same.

In addition, still another object of the present disclosure is to provide a combo antenna module, which implements the same antenna performance as that of a general combo antenna module even in a state in which the size is reduced by adjusting a gap interval of magnetic sheets disposed on each of the top and bottom of an antenna sheet within a set range.

In addition, the present disclosure has been proposed in consideration of the above situation, and yet another object of the present disclosure is to provide a combo antenna module, which prevents the occurrence of minute noise of a connector cable upon wireless power transmission by interposing a metal sheet covering a gap region of magnetic sheets disposed on each of the top and bottom of an antenna sheet, and a portable device having the same.

Solution to Problem

In order to achieve the objects, according to an embodiment of the present disclosure, there is provided a combo antenna module including: an antenna sheet on which a plurality of radiation patterns are formed, a top magnetic sheet disposed on an upper surface of the antenna sheet, and disposed adjacent to a first side of the antenna sheet, and a bottom magnetic sheet disposed on a lower surface of the antenna sheet, and disposed adjacent to a second side of the antenna sheet opposite to the first side of the antenna sheet, in which the top magnetic sheet may include a first projecting region overlapping the bottom magnetic sheet with the antenna sheet interposed therebetween, and the top magnetic sheet and the bottom magnetic sheet may be spaced apart from each other to have a gap interval within a set range at a side portion of the first projecting region.

The combo antenna module according to an embodiment of the present disclosure may include an expansion magnetic sheet disposed on an upper surface of one of the top magnetic sheet and the antenna sheet, and disposed adjacent to the first side of the antenna sheet, and the expansion magnetic sheet may include one or more expansion regions extending from an outer circumference of a region overlapping the antenna sheet and disposed outside the antenna sheet.

The combo antenna module according to an embodiment of the present disclosure may further include a metal sheet disposed on an upper surface of the expansion magnetic sheet and disposed a gap region between the bottom magnetic sheet and the expansion magnetic sheet.

In order to achieve the objects, a portable device includes a combo antenna module disposed under a battery, and a connector cable disposed adjacent to the combo antenna module, in which the combo antenna module includes an expansion magnetic sheet disposed under the battery and the connector cable to overlap the connector cable.

The combo antenna module may further include an antenna sheet formed with a radiation patch, and disposed under the battery, a top magnetic sheet disposed above the antenna sheet, and having the entire region overlapping the antenna sheet, and a bottom magnetic sheet disposed above the antenna sheet, and overlapping a part of the top magnetic sheet, and the expansion magnetic sheet may be interposed at one of a position between the battery and the top magnetic sheet and a position between the antenna sheet and the top magnetic sheet, and may expand in an outward direction of the antenna sheet and be disposed under the connector cable. At this time, the expansion magnetic sheet may be divided into a base region and a projecting region extending from one side of the base region, and the base region may include a main region overlapping the antenna sheet and one or more expansion regions extending from an outer circumference of the main region to overlap the connector cable.

The bottom magnetic sheet may partially overlap a projecting part of the top magnetic sheet with the antenna sheet interposed therebetween, and may be spaced apart from the top magnetic sheet to have a gap interval within a set range at both sides of a region overlapping the top magnetic sheet.

The bottom magnetic sheet may partially overlap a projecting part of the expansion magnetic sheet with the antenna sheet interposed therebetween, and may be spaced apart from the expansion magnetic sheet to have a gap interval within a set range at both sides of a region overlapping the expansion magnetic sheet.

The bottom magnetic sheet may include a main region overlapping the antenna sheet and one or more expansion regions expanding from the main region to overlap the connector cable, and the expansion region of the bottom magnetic sheet may be spaced apart from the expansion region of the expansion magnetic sheet to have a gap interval within a set range.

The portable device according to an embodiment of the present disclosure may further include a metal sheet disposed above the expansion magnetic sheet, and disposed in a gap region between the bottom magnetic sheet and the expansion magnetic sheet.

Advantageous Effects of Invention

In the present disclosure, according to the combo antenna module, it is possible to smoothly flow the magnetic field of the second radiation pattern and the third radiation pattern to improve the antenna performance in the frequency band corresponding to the second radiation pattern and the third radiation pattern by having the magnetic sheets disposed on each of the top and bottom of the antenna sheet disposed to have the gap interval within the set range.

In addition, according to the combo antenna module, it is possible to prevent the noise from being generated in the surrounding parts by the magnetic fields of the radiation patterns by having the magnetic sheets disposed on each of the top and bottom of the antenna sheet disposed to have the gap interval within the set range.

In addition, according to the combo antenna module, it possible to prevent the flicker phenomenon of the display generated by the noise by having the magnetic sheets disposed on each of the top and bottom of the antenna sheet disposed to have the gap interval within the set range to prevent the noise from being generated in the surrounding parts.

In addition, it is possible to minimize the interference between the second radiation pattern and the third radiation pattern even in the small size to improve the antenna performance by forming the combo antenna module so that the second radiation pattern and the third radiation pattern have the inclinations opposite to each other in the crossing region.

In addition, it is possible to improve the recognition rate and recognition distance of the MST frequency band in the small portable device by forming the combo antenna module so that the second radiation pattern and the third radiation pattern have the inclinations opposite to each other in the crossing region.

In addition, it is possible to minimize the occurrence of cracks upon bending test to secure reliability by forming the combo antenna module so that the second radiation pattern and the third radiation pattern have the inclinations opposite to each other in the crossing region.

In addition, according to the combo antenna module and the portable device having the same, it is possible to prevent the noise from being generated in the connector cable by the TX magnetic field upon wireless power transmission by forming the gap interval between the bottom magnetic sheet and the expansion magnetic sheet and expanding the expansion magnetic sheet.

In addition, according to the combo antenna module and the portable device having the same, it is possible to prevent the occurrence of the abnormality phenomenon due to the noise of the connector cable such as the flicker phenomenon of the display, module by preventing the noise from being generated in the connector cable by the TX magnetic field.

In addition, according to the combo antenna module and the portable device having the same, it is possible to prevent the generation of noise in the connector cable and improve the NFC and MST communication performance by forming the gap interval between the bottom magnetic sheet and the expansion magnetic sheet and expanding the expansion magnetic sheet.

In addition, according to the combo antenna module and the portable device having the same, it is possible to prevent the minute noise from being generated in the connector cable by shielding the TX magnetic field applied to the connector cable through the gap region by interposing the metal sheet covering the gap region of the magnetic sheets disposed on each of the top and bottom of the antenna sheet.

BRIEF DESCRIPTION OF DRAWINGS

FIG. 1 is a view for describing an example of a portable device to which a combo antenna module according to a first embodiment of the present disclosure is applied.

FIG. 2 is a view for describing the combo antenna module according to the first embodiment of the present disclosure.

FIGS. 3 to 6 are views for describing an antenna sheet in FIG. 2.

FIGS. 7 to 9 are views for describing antenna performance according to a radiation pattern structure.

FIG. 10 is a view for describing a top magnetic sheet in FIG. 2.

FIG. 11 is a view for describing a bottom magnetic sheet in FIG. 2.

FIGS. 12 and 13 are views for describing an overlap between the top magnetic sheet and the bottom magnetic sheet in FIG. 2.

FIG. 14 is a view for describing a radiation pattern exposed through a gap region between the top magnetic sheet and the bottom magnetic sheet.

FIGS. 15 to 17 are views for describing antenna performance according to a gap interval between the top magnetic sheet and the bottom magnetic sheet.

FIG. 18 is a view for describing a modified example of the portable device to which a combo antenna module according to a second embodiment of the present disclosure is applied.

FIG. 19 is a view for describing a top magnetic sheet in FIG. 18.

FIGS. 20 and 21 are views for describing a bottom magnetic sheet in FIG. 18.

FIGS. 22 and 23 are views for describing an expansion magnetic sheet in FIG. 18, FIG. 24 is a view for describing an overlap between the top magnetic sheet and the bottom magnetic sheet in FIG. 18.

FIG. 25 is a view for describing an overlap between the expansion magnetic sheet and the bottom magnetic sheet in FIG. 18, FIG. 26 is a view for describing a radiation pattern exposed through a gap region between the expansion magnetic sheet and the bottom magnetic sheet in FIG. 18.

FIGS. 27 and 28 are views for describing a portable device in which a general combo antenna module is mounted.

FIGS. 29 to 31 are views for describing a portable device provided with the combo antenna module according to the second embodiment of the present disclosure.

FIGS. 32 to 34 are views for describing antenna performance of the portable device provided with the combo antenna module according to the second embodiment of the present disclosure.

FIGS. 35 and 36 are views for describing a phenomenon in which a magnetic field is introduced into a connector cable through the gap region of the combo antenna module according to the second embodiment of the present disclosure.

FIGS. 37 to 41 are views for describing a combo antenna module according to a third embodiment of the present disclosure.

FIGS. 42 to 45 are views for describing antenna performance of a portable device provided with the combo antenna module according to the third embodiment of the present disclosure.

DESCRIPTION OF EMBODIMENTS

Hereinafter, the most preferred embodiments of the present disclosure will be described with reference to the accompanying drawings in order to specifically describe the embodiments so that those skilled in the art to which the present disclosure pertains may easily implement the technical spirit of the present disclosure. First, in adding reference numerals to the components of each drawing, it should be noted that the same components have the same reference numerals as much as possible even when they are shown in different drawings. In addition, in describing the present disclosure, when it is determined that the detailed description of the related well-known configuration or function may obscure the gist of the present disclosure, the detailed description thereof will be omitted.

Referring to FIG. 1, a combo antenna module 100 according to an embodiment of the present disclosure is mounted on a small portable device having a mounting space narrower than that of a general smartphone. For example, the small portable device is a foldable phone 10 folded vertically, a wearable device, or the like.

For example, since the foldable phone 10 is vertically folded, the mounting space is reduced by half compared to the general smartphone. The combo antenna module 100 is reduced in size by the reduced mounting space, thereby making it difficult to implement antenna performance.

Accordingly, the combo antenna module 100 according to an embodiment of the present disclosure provides antenna performance greater than or equal to that of the combo antenna module 100 applied to the general smartphone even in a state in which the size is reduced by adjusting a gap interval OW of magnetic sheets disposed on each of the top and bottom of an antenna sheet 110 within a set range based on the characteristics of an antenna required for the portable device.

Referring to FIG. 2, the combo antenna module 100 according to a first embodiment of the present disclosure is configured to include the antenna sheet 110 on which a plurality of radiation patterns are formed, a top magnetic sheet 120 disposed on an upper surface of the antenna sheet 110, and a bottom magnetic sheet 130 disposed on a lower surface of the antenna sheet 110.

The antenna sheet 110 includes a plurality of radiation patterns resonating in different frequency bands. It is described that the antenna sheet 110 includes, for example, a first radiation pattern 112 resonating in a WPC frequency band for wireless power transmission (or wireless charging), a second radiation pattern 113 resonating in an NFC frequency band for short-range communication, and a third radiation pattern 114 resonating in an MST frequency band for electronic payment.

Referring to FIGS. 3 and 4, the antenna sheet 110 is configured to include a base sheet 111, the first radiation pattern 112, the second radiation pattern 113, and the third radiation pattern 114.

The base sheet 111 is formed of a thin flexible substrate such as a film, a sheet, or a thin film substrate. The base sheet 111 may be a flexible printed circuit board (FPCB). For example, the base sheet 111 is a polypropylene (PP) sheet. Here, the base sheet 111 is not limited thereto, and may be variously used as long as it is a thin film substrate and may be formed with a radiation pattern configuring an antenna.

The base sheet 111 has a first side S11, a second side S12 opposite to the first side S11, a third side S13 connected to one end of the first side S11 and one end of the second side S12, and a fourth side S14 opposite to the third side S13 and connected to the other end of the first side S11 and the other end of the second side S12. Here, it is assumed that the first side S11 to the fourth side S14 are to facilitate the description of the present disclosure, and in an actual product, as shown in the drawings, a terminal part 115 for terminal connection of radiation patterns, an extension 116 extending from one of the four sides, and the like are formed, so that the side may not be formed in a straight line. In this case, the first side S11 to the fourth side S14 may be defined based on a rectangular region of the base sheet 111 in which the radiation pattern is formed.

The first radiation pattern 112 is disposed on the upper surface of the base sheet 111. The first radiation pattern 112 is formed in a loop shape in which a first winding axis is wound a plurality of times. Here, the first winding axis is a virtual axis orthogonal to a central portion of the base sheet 111, and for example, the first radiation pattern 112 resonates in the WPC frequency band.

At this time, in the base sheet 111, the first radiation pattern 112 may be divided into an inner circumferential region IZ, which is a region disposed on an inner circumference of the loop shape, and an outer circumferential region OZ, which is disposed on an outer circumference of the loop shape based on the loop shape.

The first radiation pattern 112 may also be disposed on the lower surface of the base sheet 111. The first radiation pattern 112 disposed on the upper surface of the base sheet 111 and the first radiation pattern 112 disposed on the lower surface of the base sheet 111 are connected through a via hole. The first radiation pattern 112 forms a loop via the first radiation pattern 112 not formed on the upper surface of the base sheet 111 but formed on the lower surface of the base sheet 111 in cross regions (a first crossing region A1, a second crossing region A2, a third crossing region A3, and a fourth crossing region A4).

The second radiation pattern 113 is disposed on the upper surface of the base sheet 111. The second radiation pattern 113 is disposed adjacent to the first side S11 of the base sheet 111. The second radiation pattern 113 is formed in a loop shape in which a second winding axis spaced apart from the first winding axis is wound a plurality of times. Here, the second winding axis is a virtual axis orthogonal to a position spaced apart from the first winding axis by a predetermined interval toward the first side S11 of the base sheet 111, and for example, the second radiation pattern 113 resonates in the NFC frequency band.

The second radiation pattern 113 crosses the first radiation pattern 112. In other words, the second radiation pattern 113 alternately passes through the inner circumferential region IZ and the outer circumferential region OZ of the base sheet 111 and crosses the loop of the first radiation pattern 112 in the first crossing region A1 and the second crossing region A2.

The second radiation pattern 113 has an inclination that is closer to the first side S11 of the base sheet 111 from the inner circumference to the outer circumference of the first radiation pattern 112. In other words, the second radiation pattern 113 has an inclination that is closer to the first side S11 of the base sheet 111 toward the outer circumference of the first radiation pattern 112 in the first crossing region A1 and the second crossing region A2 and moves away from the third radiation pattern 114.

The third radiation pattern 114 is disposed on the upper surface of the base sheet 111. The third radiation pattern 114 is disposed adjacent to the second side S12 of the base sheet 111. The third radiation pattern 114 is formed in a loop shape in which a third winding axis spaced apart from the first winding axis and the second winding axis is wound a plurality of times. Here, the third winding axis is a virtual axis orthogonal to a position spaced apart from the first winding axis by a predetermined interval toward the second side S12 of the base sheet 111, and for example, the third radiation pattern 114 resonates in the MST frequency band.

The third radiation pattern 114 crosses the first radiation pattern 112. In other words, the third radiation pattern 114 alternately passes through the inner circumferential region IZ and the outer circumferential region OZ of the base sheet 111 and crosses the loop of the first radiation pattern 112 in the third crossing region A3 and the fourth crossing region A4.

The third radiation pattern 114 has an inclination that is closer to the second side S12 of the base sheet 111 from the inner circumference to the outer circumference of the first radiation pattern 112. In other words, the third radiation pattern 114 has an inclination that is closer to the second side S12 of the base sheet 111 and moves away from the second radiation pattern 113 toward the outer circumference of the first radiation pattern 112 in the third crossing region A3 and the fourth crossing region A4.

The third radiation pattern 114 may be formed to have a plurality of refraction portions. The third radiation pattern 114 may be formed in a quadrangular loop having a first refraction portion R1 to a fourth refraction portion R4. At this time, a refraction portion of a region facing the second radiation pattern 113 among the plurality of refraction portions may be exposed through a gap region GA between the top magnetic sheet 120 and the bottom magnetic sheet 130, which will be described later.

The second radiation pattern 113 and the third radiation pattern 114 maintain the same gap interval G1 in the inner circumferential region IZ of the first radiation pattern 112. The gap interval between the second radiation pattern 113 and the third radiation pattern 114 increases toward the outer circumference of the first radiation pattern 112 between the inner and outer circumferences of the first radiation pattern 112. The second radiation pattern 113 and the third radiation pattern 114 maintain the same gap interval G2 after passing through the outer circumference of the first radiation pattern 112. At this time, the gap interval G2 in the outer circumferential region OZ of the first radiation pattern 112 is greater than the gap interval G1 in the inner circumferential region IZ of the first radiation pattern 112.

Referring to FIG. 5, the second radiation pattern 113 and the third radiation pattern 114 may also be formed to always have a constant gap interval GW. In other words, the second radiation pattern 113 and the third radiation pattern 114 maintain the same gap interval G1 in the inner circumferential region IZ of the first radiation pattern 112, a region between the inner and outer circumferences of the first radiation pattern 112, and the outer circumferential region OZ of the first radiation pattern 112.

However, since the gap interval GW between the second radiation pattern 113 and the third radiation pattern 114 is narrow, the antenna performance of the second radiation pattern 113 may be degraded. In other words, since the gap interval GW is narrow, signal interference may occur between the second radiation pattern 113 and the third radiation pattern 114, thereby degrading antenna performance.

In addition, since facing portions of the second radiation pattern 113 and the third radiation pattern 114 are formed in a straight shape to maintain the same gap interval GW, there is a high possibility of cracks upon the bending test, thereby degrading reliability.

Accordingly, the combo antenna module 100 according to the first embodiment of the present disclosure forms the second radiation pattern 113 and the third radiation pattern 114 to have an inclination in the crossing regions A1 to A4.

Referring to FIG. 6, the second radiation pattern 113 and the third radiation pattern 114 are formed to have the same inclination in the first crossing region A1 to the fourth crossing region A4, and thus may also be formed to always have the constant gap interval GW. In other words, the second radiation pattern 113 is formed to have an inclination that is closer to the first side S11 toward the outer circumference of the first radiation pattern 112 in the first crossing region A1 and the second crossing region A2, and the third radiation pattern 114 is formed to have an inclination that is closer to the first side S11 of the base sheet 111 toward the outer circumference of the first radiation pattern 112 of the base sheet 111 in the second crossing region A3 and the fourth crossing region A4. Accordingly, the second radiation pattern 113 and the third radiation pattern 114 are formed to have the same gap interval GW as those of other regions even in the crossing regions.

In this case, since the second radiation pattern 113 and the third radiation pattern 114 have an inclination, it is possible to minimize the occurrence of cracks upon the bending test, thereby securing the reliability of the combo antenna module 100.

However, since the gap interval GW between the second radiation pattern 113 and the third radiation pattern 114 is always constant and the gap interval (1 W is narrow, the antenna performance of the second radiation pattern 113 may be degraded. In other words, since the gap interval GW is narrow, signal interference may occur between the second radiation pattern 113 and the third radiation pattern 114, thereby degrading antenna performance.

Accordingly, in the combo antenna module 100 according to the first embodiment of the present disclosure, the gap interval GW between the second radiation pattern 113 and the third radiation pattern 114 is formed to be increased in the crossing regions A1 to A4. Accordingly, the combo antenna module 100 may minimize the interference between the second radiation pattern 113 and the third radiation pattern 114, thereby improving the antenna performance of the second radiation pattern 113 and the third radiation pattern 114.

Of course, since the combo antenna module 100 has the inclination in the first crossing region A1 to the fourth crossing region A4, it is possible to minimize the occurrence of cracks upon the bending test.

FIG. 7 shows the MST antenna performance test results according to the shapes of the second radiation pattern 113 and the third radiation pattern 114.

First, describing the MST antenna performance test environment, a portable device and a reader on which the combo antenna module 100 is mounted are center-aligned, and the portable device is disposed to be spaced apart from an upper portion of the reader by about 2 cm. While the portable device is moved by 1 cm with respect to X and Y axes, whether the MST communication between the portable device and the reader is successful is tested. At this time, the MST antenna performance test is performed over the total area of the portable device, and a ratio of the MST communication success region to the total area is defined as a recognition rate.

When the second radiation pattern 113 and the third radiation pattern 114 are configured in a straight shape at the portions facing each other to always have the constant gap interval GW, the combo antenna module 100 has a recognition rate of about 47.71% according to the MST antenna performance test result.

When the second radiation pattern 113 and the third radiation pattern 114 have the same inclination in the crossing region, the combo antenna module 100 has a recognition rate of about 47.06% according to the MST antenna performance test result.

When the second radiation pattern 113 and the third radiation pattern 114 have opposite inclinations in the crossing region, the combo antenna module 100 has a recognition rate of about 50.33% according to the MST antenna performance test result.

When the second radiation pattern 113 and the third radiation pattern 114 have opposite inclinations in the crossing region, the recognition rate is improved by about 3% compared to other structures. The improvement in the recognition rate of about 3% does not give a significant impact in the size of a general portable device, but in a small portable device such as a foldable phone, it is possible to greatly improve the antenna performance recognized by the user through the improvement in the recognition rate of about 3%.

As described above, in the combo antenna module 100 according to the first embodiment of the present disclosure, the second radiation pattern 113 and the third radiation pattern 114 are formed to have the opposite inclinations in the crossing region, so that it is possible to improve the recognition rate of the MST frequency band in the small portable device.

FIG. 8 shows a performance test result of an NFC antenna operating in a card mode. Here, FIG. 8 is a test result for ACM1252, which is a type of an NFC reader, and a load modulation shows the result that the ACM1252 was tested in a state of disposing the portable device (i.e., an interval between the portable device and the reader) at heights of 0 cm, 1 cm, 2 cm, and 3 cm.

When the second radiation pattern 113 and the third radiation pattern 114 are configured in a straight shape at the portions facing each other to always have the constant gap interval GW, the combo antenna module 100 has a recognition distance of about 63 mm according to the NFC card mode test result.

When the second radiation pattern 113 and the third radiation pattern 114 have the same inclination in the crossing region, the combo antenna module 100 has a recognition distance of about 60 mm according to the NFC card mode test result.

When the second radiation pattern 113 and the third radiation pattern 114 have opposite inclinations in the crossing region, the combo antenna module 100 has a recognition distance of about 68 mm according to the NFC card mode test result.

When the second radiation pattern 113 and the third radiation pattern 114 have opposite inclinations in the crossing region, the recognition distance is improved by about 5 to 8 mm compared to other structures. In other words, the combo antenna module 100 according to the first embodiment of the present disclosure enables the NFC communication even at a position further spaced apart by about 5 to 8 mm compared to other combo antenna modules 100.

As described above, in the combo antenna module 100 according to the first embodiment of the present disclosure, the second radiation pattern 113 and the third radiation pattern 114 are formed to have the opposite inclinations in the crossing region, so that it is possible to improve the recognition distance in the card mode of the NFC frequency band in the small portable device.

The second radiation pattern 113 and the third radiation pattern 114 are formed in a straight shape at the portions facing each other to always have the constant gap interval GW. When the portable device is disposed on the upper portion of the reader without the gap, the combo antenna module 100 has a load modulation characteristic of about 31.57 mV, which exceeds a reference value of 8.8 mV. When the portable device is spaced apart from the upper portion of the reader by about 1 cm, the combo antenna module 100 has a load modulation characteristic of about 1927 mV, which exceeds a reference value of 7.2 my. When the portable device is spaced apart from the upper portion of the reader by about 2 cm, the combo antenna module 100 has a load modulation characteristic of about 22.48 mV, which exceeds a reference value of 5.6 mV. When the portable device is spaced apart from the upper portion of the reader by about 3 CM, the combo antenna module 100 has a load modulation characteristic of about 21.12 mV, which exceeds a reference value of 4.0 mV.

The second radiation pattern 113 and the third radiation pattern 114 have the same inclination in the crossing region. When the portable device is disposed on the upper portion of the reader without the gap, the combo antenna module 100 has a load modulation characteristic of about 30.77 mV, which exceeds a reference value of 8.8 mV. When the portable device is spaced apart from the upper portion of the reader by about 1 cm, the combo antenna module 100 has a load modulation characteristic of about 18.36 mV, which exceeds the reference value of 7.2 mV. When the portable device is spaced apart from the upper portion of the reader by about 2 cm, the combo antenna module 100 has a load modulation characteristic of about 21.52 mV, which exceeds the reference value of 5.6 mV. When the portable device is spaced apart from the upper portion of the reader by about 3 cm, the combo antenna module 100 has a load modulation characteristic of about 20.11 MY, which exceeds the reference value of 4.0 mV.

The second radiation pattern 113 and the third radiation pattern 114 have the opposite inclinations in the crossing region. When the portable device is disposed on the upper portion of the reader without the gap, the combo antenna module 100 has a load modulation characteristic of about 37.55 mV, which exceeds the reference value of 8.8 mV. When the portable device is spaced apart from the upper portion of the reader by about 1 cm, the combo antenna module 100 has a load modulation characteristic of about 20.59 mV, which exceeds the reference value of 7.2 mV. When the portable device is spaced apart from the upper portion of the reader by about 2 cm, the combo antenna module 100 has a load modulation characteristic of about 24.11 mV, which exceeds the reference value of 5.6 mV. When the portable device is spaced apart from the upper portion of the reader by about 3 cm, the combo antenna module 100 has a load modulation characteristic of about 23.62 mV, which exceeds the reference value of 4.0 mV.

When the second radiation pattern 113 and the third radiation pattern 114 have the opposite inclinations in the crossing region, the load modulation characteristic is improved by about 2 my to 7 mV compared to other structures. In other words, the combo antenna module 100 according to the first embodiment of the present disclosure enables faster and more accurate communication than that of the conventional combo antenna module 100.

As described above, in the combo antenna module 100 according to the first embodiment of the present disclosure, the second radiation pattern 113 and the third radiation pattern 114 are formed to have the opposite inclinations in the crossing region, so that it is possible to increase the load modulation in the card mode of the NEC frequency band in the small portable device, thereby enabling faster and more accurate communication than that of the conventional combo antenna module 100.

FIG. 9 shows the results of testing the recognition distance of the NFC antenna operating in a reader mode. Here, in FIG. 9, Type1, Type2, Type4, Type4 small, TypeB, and TypeF are standard names defined in the NEC forum, and Topaz, Ultra-light, NTAG203, ULC, Desfire EV1, TecTiles, NETS Flash, Process_16.0, and OCTOPUS thereunder are commercial tags that operate with the corresponding Type, respectively.

When the second radiation pattern 113 and the third radiation pattern 114 are formed in a straight shape at the portions facing each other to always have the constant gap interval GW, the combo antenna module 100 has recognition distances that are about 30 mm in Type1, about 37 mm, 30 mm, or 16 mm depending on products in Type2, about 17 mm in Type4, about 15 mm in Type4 small, about 14 mm or 15 mm depending on products in TypeB, and about 25 mm in TypeF according to the NEC reader mode test result.

When the second radiation pattern 113 and the third radiation pattern 114 have the same inclination in the crossing region, the combo antenna module 100 has recognition distances that are about 29 mm in Type1, about 36 mm, 29 mm, or 15 mm depending on products in Type2, about 16 mm in Type4, about 14 mm Type4 small, about 13 mm or 14 mm depending on products in TypeB, and about 25 mm in TypeF according to the NEC reader mode test result.

When the second radiation pattern 113 and the third radiation pattern 114 have the opposite inclinations in the crossing region, the combo antenna module 100 has recognition distances that are about 33 mm Type1, about 41 mm, 32 mm, or 18 mm depending on products in Type2, about 19 mm in Type4, about 19 mm in Type4 small, about 15 mm or 16 mm depending on products in TypeB, and about 30 mm in TypeF according to the NFC reader mode test result.

When the second radiation pattern 113 and the third radiation pattern 114 have the opposite inclinations in the crossing region, the recognition distance increases by about 1 cm at minimum or about 5 cm at maximum compared to other structures. In other words, the combo antenna module 100 according to the first embodiment of the present disclosure enables the NFC communication even at a position further spaced apart by about 1 to 5 cm compared to other combo antenna modules 100.

As described above, in the combo antenna module 100 according to the first embodiment of the present disclosure, the second radiation pattern 113 and the third radiation pattern 114 are formed to have the opposite inclinations in the crossing region, so that it is possible to improve the recognition distance in the reader mode of the NFC frequency band in the small portable device.

The top magnetic sheet 120 is disposed on the upper surface of the antenna sheet 110. The top magnetic sheet 120 is disposed adjacent to the first side S11 of the base sheet 111. The top magnetic sheet 120 is disposed in regions overlapping the first radiation pattern 112 and the second radiation pattern 113. Referring to FIG. 10, the top magnetic sheet 120 may be divided into a base region 121 and a projecting region 122.

The base region 121 is disposed adjacent to the first side S11 of the base sheet 111. The base region 121 includes a first side S21 facing the bottom magnetic sheet 130, a second side S22 opposite to the first side S21 and disposed adjacent to the first side S11 of the base sheet 111, a third side S23 connected to one end of the first side S21 and one end of the second side S22, and a fourth side S24 connected to the other end of the first side S21 and the other end of the second side S22.

The projecting region 122 extends from the first side S21 of the base region 121. The projecting region 122 extends from the first side S21 of the base region 121 toward the second side S12 of the base sheet 111.

A partial region of the projecting region 122 disposed in a direction opposite to the base region 121 overlaps the bottom magnetic sheet 130. At this time, the projecting region 122 has the partial region extending toward the second side S12 of the base sheet 111 and the partial region overlaps the bottom magnetic sheet 130 with the antenna sheet 110 interposed therebetween.

A width of the projecting region 122 is formed to be smaller than a width of the base region 121 (i.e., the shortest distance between the third side S23 and the fourth side S24 of the base region 121). Accordingly, a first side part S21' of the base region 121 faces the bottom magnetic sheet 130 at both sides of the projecting region 122 and is spaced apart from the bottom magnetic sheet 130 by a predetermined interval or more.

The bottom magnetic sheet 130 is disposed on the lower surface of the antenna sheet 110. At this time, the bottom magnetic sheet 130 is disposed adjacent to the second side S12 of the base sheet 111 opposite to the first side S11 of the base sheet 111. The bottom magnetic sheet 130 is disposed in a region overlapping the third radiation pattern 114.

Referring to FIG. 11, a recess 132 is formed at one side of the bottom magnetic sheet 130 facing the top magnetic sheet 120. The recess 132 is formed to have a shape corresponding to the first radiation pattern 112 so that the bottom magnetic sheet 130 does not overlap the first radiation pattern 112.

The recess 132 is formed to have a width smaller than that of one side of the bottom magnetic sheet 130 facing the top magnetic sheet 120. Accordingly, the bottom magnetic sheet 130 faces the top magnetic sheet 120 at both sides of the recess 132. At this time, the bottom magnetic sheet 131) is spaced apart from the first side part S21' of the base region 121 of the top magnetic sheet 120 by a set range or more.

Referring to FIG. 12, the top magnetic sheet 120 and the bottom magnetic sheet 130 overlap each other at a part of the third radiation pattern 114 and are spaced apart from each other to have the gap interval GW within the set range at both sides of the overlapping region to form the gap region GA.

The gap interval GW between the top magnetic sheet 120 and the bottom magnetic sheet 130 may be adjusted within the set range according to the antenna characteristics required by the portable device.

When a current is applied to the radiation patterns in a state in which the gap interval GW between the top magnetic sheet 120 and the bottom magnetic sheet 130 exceeds a maximum value of the set range, the magnetic fields formed in the radiation patterns become strong and affect parts in the portable device.

For example, noise is generated in a connector cable connecting a display of the portable device and a main board due to the magnetic field generated from the first radiation pattern 112 upon wireless power transmission, and a flicker phenomenon may occur in the display due to the noise of the connector cable.

As another example, referring to FIG. 13, the magnetic field generated from the second radiation pattern 113 is required to pass through the top magnetic sheet 120 to move in an upward direction of the combo antenna module 100, and when the gap interval GW between the top magnetic sheet 120 and the bottom magnetic sheet 130 exceeds the maximum value of the set range, the magnetic field may not flow well in the upward direction of the combo antenna module 100 to cause loss, thereby degrading the antenna performance (e.g., MST communication performance) of the second radiation pattern 113.

Meanwhile, when a current is applied to the radiation patterns in a state where the gap interval GW between the top magnetic sheet 120 and the bottom magnetic sheet 130 is less than a minimum value of the set range, the gap interval GW between the top magnetic sheet 120 and the bottom magnetic sheet 130 are in a narrow state, so that the magnetic fields formed in the radiation patterns may not pass through the gap interval GW and stagnate, thereby degrading the antenna performance.

For example, the magnetic fields generated from the second radiation pattern 113 and the third radiation pattern 114 may not smoothly pass through the gap interval GW between the top magnetic sheet 120 and the bottom magnetic sheet 130 and are stagnated, thereby degrading the short-range communication performance.

In other words, referring to FIG. 13, the magnetic field generated from the second radiation pattern 113 is required to pass through the top magnetic sheet 120 to move in the upward direction of the combo antenna module 100, and when the gap interval GW between the top magnetic sheet 120 and the bottom magnetic sheet 130 is less than the minimum value of the set range, the magnetic field of the second radiation pattern 113 may not be sufficiently formed on the lower portion of the combo antenna module 100 due to the stagnation of the magnetic field, thereby degrading the antenna performance (e.g., MST communication performance) of the second radiation pattern 113.

Accordingly, the gap interval GW between the top magnetic sheet 120 and the bottom magnetic sheet 130 is formed to have an interval within the set range according to the antenna characteristics required by the portable device.

At this time, the set range is, for example, 2 mm or more and 8 mm or less. The set range may be set to a relative length with the antenna sheet 110, and in this case, may be set to 5% or more and 20% or less of the length of the antenna sheet 110. Here, the length of the antenna sheet 110 is a length of the region of the antenna sheet 110 where the radiation pattern is formed, and is, for example, the shortest distance between the first side S11 and the second side S12 of the base sheet 111, and when the length of the antenna sheet is about 38 mm, the set range may be about 1.9 mm or more and 7.6 mm or less. The set range may be set to a relative length with the base sheet 111, and in this case, may be set to 5% or more and 20% or less of the length of the base sheet 111. Here, the length of the base sheet 111 may be a length in a direction orthogonal to the first side S11 and the second side S12, and when the length of the base sheet is about 38 mm, the set range is about 1.9 mm or more and 7.6 mm or less.

The top magnetic sheet 120 and the bottom magnetic sheet 130 may be formed to have the same gap interval GW at both sides of the projecting region 122 or the recess 132, In other words, the top magnetic sheet 120 and the bottom magnetic sheet 130 may be disposed so that the gap interval OW of the base sheet 111 toward the third side is the same as the gap interval GW toward the fourth side S14.

Referring to FIG. 14, one of the plurality of radiation patterns included in the antenna sheet 110 is exposed through the gap region GA between the top magnetic sheet 120 and the bottom magnetic sheet 130. In other words, the first refraction portion R1 and the second refraction portion R2 among the first refraction portion R1 to the fourth refraction portion R4 of the third radiation pattern 114, which are positioned in the regions facing the second radiation pattern 113 are exposed through the gap region GA between the top magnetic sheet 120 and the bottom magnetic sheet 130.

Accordingly, the combo antenna module 100 may improve the antenna performance (i.e., MST performance) of the third radiation pattern 114 by increasing the intensity of the magnetic field generated from the third radiation pattern 114.

Meanwhile, when the third radiation pattern 114 is not exposed through the gap region GA between the top magnetic sheet 120 and the bottom magnetic sheet 130, the combo antenna module 100 may reduce the intensity of the magnetic field generated from the third radiation pattern 114, thereby degrading the antenna performance (i.e., MST performance) of the third radiation pattern 114.

Accordingly, the combo antenna module 100 is configured so that a part of the third radiation pattern 114 is exposed through the gap region GA between the top magnetic sheet 120 and the bottom magnetic sheet 130.

FIG. 15 shows the MST antenna performance test result according to the gap interval GW between the top magnetic sheet 120 and the bottom magnetic sheet 130.

First, describing the MST antenna performance test environment, a portable device and a reader on which the combo antenna module 100 is mounted are center-aligned, and the portable device is disposed to be spaced apart from an upper portion of the reader by about 2 cm. While the portable device is moved by 1 cm with respect to X and Y axes, whether the MST communication between the portable device and the reader is successful is tested. At this time, the MST antenna performance test is performed on the total area of the portable device, and the ratio of the MST communication success region to the total area is defined as the recognition rate.

When the gap interval GW between the top magnetic sheet 120 and the bottom magnetic sheet 130 is about 2 mm, the combo antenna module 100 has a recognition rate of about 47.06% according to the MST antenna performance test result.

When the gap interval GW between the top magnetic sheet 120 and the bottom magnetic sheet 130 is about 5 mm, the combo antenna module 100 has a recognition rate of about 50.33% according to the MST antenna performance test result.

When the gap interval GW between the top magnetic sheet 120 and the bottom magnetic sheet 130 is about 7 mm, the combo antenna module 100 has a recognition rate of about 49.67% according to the MST antenna performance test result.

When the gap interval GW between the top magnetic sheet 120 and the bottom magnetic sheet 130 is about 9 mm, the combo antenna module 100 has a recognition rate of about 48.37% according to the MST antenna performance test result.

When the gap interval GW between the top magnetic sheet 120 and the bottom magnetic sheet 130 is about 11 mm, the combo antenna module 100 has a recognition rate of about 47.36% according to the MST antenna performance test result.

The combo antenna module 100 has a different recognition rate depending on the gap interval GW between the top magnetic sheet 120 and the bottom magnetic sheet 130. At this time, the combo antenna module 100 satisfies the recognition rate characteristic of the MST antenna required in the industry when the gap interval GW is about 2 mm to 11 mm, and has the highest recognition rate when the gap interval GW is about 5 mm.

As described above, the combo antenna module 100 according to the first embodiment of the present disclosure forms the gap interval GW (the gap region GA) between the top magnetic sheet 120 and the bottom magnetic sheet 130, so that it is possible to improve the recognition rate of the MST frequency band in the small portable device.

FIG. 16 shows a performance test result of an NFC antenna operating in a card mode, Here, FIG. 17 is a test result for ACM1252, which is a type of an NFC reader, and a load modulation shows the result that the ACM1252 was tested in a state of disposing the portable device (i.e., an interval between the portable device and the reader) at heights of 0 cm, 1 cm, 2 cm, and 3 cm.

When the gap interval GW between the top magnetic sheet 120 and the bottom magnetic sheet 130 is about 2 mm, the combo antenna module 100 has a recognition distance of about 67 mm according to the NFC card mode test result.

When the gap interval GW between the top magnetic sheet 120 and the bottom magnetic sheet 130 is about 5 mm, the combo antenna module 100 has a recognition distance of about 68 mm according to the NFC card mode test result.

When the gap interval (1 W between the top magnetic sheet 120 and the bottom magnetic sheet 130 is about 7 mm, the combo antenna module 100 has a recognition distance of about 68 mm according to the NFC card mode test result.

When the gap interval GW between the top magnetic sheet 120 and the bottom magnetic sheet 130 is about 9 mm, the combo antenna module 100 has a recognition distance of about 67 mm according to the NFC card mode test result.

When the gap interval GW between the top magnetic sheet 120 and the bottom magnetic sheet 130 is about 11 mm, the combo antenna module 100 has a recognition distance of about 68 mm according to the NFC card mode test result.

The combo antenna module 100 has a different recognition distance depending on the gap interval GW between the top magnetic sheet 120 and the bottom magnetic sheet 130. At this time, the combo antenna module 100 satisfies the recognition distance characteristic of the MST antenna required by the industry when the gap interval GW is about 2 mm to 11 mm, and has the highest recognition distance when the gap interval GW is about 5 mm.

As described above, the combo antenna module 100 according to the first embodiment of the present disclosure forms the gap interval GW (the gap region GA) between the top magnetic sheet 120 and the bottom magnetic sheet 130, so that it is possible to satisfy the recognition distance characteristic of the MST frequency band required in the portable device even when the size of the portable device is smaller.

The top magnetic sheet 120 and the bottom magnetic sheet 130 are disposed to be spaced apart by about 2 mm. When the portable device is disposed on the upper portion of the reader without the gap, the combo antenna module 100 has a load modulation characteristic of about 36.41 mV, which exceeds the reference value of 8.8 mV. When the portable device is spaced apart from the upper portion of the reader by about 1 cm, the combo antenna module 100 has a load modulation characteristic of about 20.15 mV, which exceeds the reference value of 7.2 mV. When the portable device is spaced apart from the upper portion of the reader by about 2 cm, the combo antenna module 100 has a load modulation characteristic of about 23.99 mV, which exceeds the reference value of 5.6 mV. When the portable device is spaced apart from the upper portion of the reader by about 3 cm, the combo antenna module 100 has a load modulation characteristic of about 23.74 mV, which exceeds the reference value of 4.0 mV.

The top magnetic sheet 120 and the bottom magnetic sheet 130 are disposed to be spaced apart by about 5 mm. When the portable device is disposed on the upper portion of the reader without the gap, the combo antenna module 100 has a load modulation characteristic of about 37.55 mV, which exceeds the reference value of 8.8 mV. When the portable device is spaced apart from the upper portion of the reader by about 1 cm, the combo antenna module 100 has a load modulation characteristic of about 20.59 mV, which exceeds the reference value of 7.2 mV. When the portable device is spaced apart from the upper portion of the reader by about 2 cm, the combo antenna module 100 has a load modulation characteristic of about 24.11 mV, which exceeds the reference value of 5.6 mV. When the portable device is spaced apart from the upper portion of the reader by about 3 cm, the combo antenna module 100 has a load modulation characteristic of about 23.62 mV, which exceeds the reference value of 4.0 mV.

The top magnetic sheet 120 and the bottom magnetic sheet 130 are disposed to be spaced apart by about 7 mm. When the portable device is disposed on the upper portion of the reader without the gap, the combo antenna module 100 has a load modulation characteristic of about 37.44 mV, which exceeds the reference value of 8.8 mV. When the portable device is spaced apart from the upper portion of the reader by about 1 cm, the combo antenna module 100 has a load modulation characteristic of about 20.28 mV, which exceeds the reference value of 7.2 mV. When the portable device is spaced apart from the upper portion of the reader by about 2 cm, the combo antenna module 100 has a load modulation characteristic of about 23.89 mV, which exceeds the reference value of 5.6 mV. When the portable device is spaced apart from the upper portion of the reader by about 3 cm, the combo antenna module 100 has a load modulation characteristic of about 22.75 mV, which exceeds the reference value of 4.0 mV.

The top magnetic sheet 120 and the bottom magnetic sheet 130 are disposed to be spaced apart by about 9 mm. When the portable device is disposed on the upper portion of the reader without the gap, the combo antenna module 100 has a load modulation characteristic of about 37.01 mV, which exceeds the reference value of 8.8 mV. When the portable device is spaced apart from the upper portion of the reader by about 1 cm, the combo antenna module 100 has a load modulation characteristic of about 20.17 mV, which exceeds the reference value of 7.2 mV. When the portable device is spaced apart from the upper portion of the reader by about 2 cm, the combo antenna module 100 has a load modulation characteristic of about 23.44 mV, which exceeds the reference value of 5.6 mV. When the portable device is spaced apart from the upper portion of the reader by about 3 cm, the combo antenna module 100 has a load modulation characteristic of about 23.51 mV, which exceeds the reference value of 4.0 mV.

The top magnetic sheet 120 and the bottom magnetic sheet 130 are disposed to be spaced apart by about 11 mm. When the portable device is disposed on the upper portion of the reader without the gap, the combo antenna module 100 has a load modulation characteristic of about 36.98 mV, which exceeds the reference value of 8.8 MV. When the portable device is spaced apart from the upper portion of the reader by about 1 cm, the combo antenna module 100 has a load modulation characteristic of about 21.00 my, which exceeds the reference value of 7.2 mV. When the portable device is spaced apart from the upper portion of the reader by about 2 cm, the combo antenna module 100 has a load modulation characteristic of about 24.84 mV, which exceeds the reference value of 5.6 my. When the portable device is spaced apart from the upper portion of the reader by about 3 cm, the combo antenna module 100 has a load modulation characteristic of about 23.05 mV, which exceeds the reference value of 4.0 mV.

In the combo antenna module 100, the load modulation varies according to the gap interval GW between the top magnetic sheet 120 and the bottom magnetic sheet 130. At this time, the combo antenna module 100 satisfies the load modulation characteristic of the MST antenna required in the industry when the gap interval GW is about 2 mm to 11 mm, and has the highest recognition distance when the gap interval GW is about 5 mm.

As described above, the combo antenna module 100 according to the first embodiment of the present disclosure forms the gap interval GW (the gap region GA) between the top magnetic sheet 120 and the bottom magnetic sheet 130, so that it is possible to satisfy the load modulation characteristic of the MST frequency band required by the portable device even when the size of the portable device is smaller.

FIG. 17 shows the results of testing the recognition distance of the NFC antenna operating in the reader mode. Here, in FIG. 17. Type1, Type2, Type4, Type4 small, TypeB, and TypeF are standard names defined in the NFC forum, and Topaz, Ultra-light, NTAG203, ULC, Desfire EV1, Tec-Tiles, NETS Flash, Process_16.0, and OCTOPUS thereunder are commercial tags that operate with the corresponding Type, respectively.

When the gap interval GW between the top magnetic sheet 120 and the bottom magnetic sheet 130 is about 2 mm, the combo antenna module 100 has recognition distances that are about 33 mm in Type1, about 40 mm, 32 mm, or 18 mm depending on products in Type2, about 19 mm in Type4, about 19 mm in Type4 small, about 15 mm or 16 mm depending on products in TypeB, and about 29 mm in TypeF according to the NFC reader mode test result.

When the gap interval GW between the top magnetic sheet 120 and the bottom magnetic sheet 130 is about 5 mm, the combo antenna module 100 has recognition distances that are about 33 mm in Type1, about 41 mm, 32 mm, or 18 mm depending on products in Type2, about 19 Mal Type4, about 19 mm in Type4 small, about 15 mm or 16 mm depending on products in Type13, and about 30 mm in TypeF according to the NFC reader mode test result.

When the gap interval GW between the top magnetic sheet 120 and the bottom magnetic sheet 130 is about 7 mm, the combo antenna module 100 has recognition distances that are about 33 mm in Type1, about 41 mm, 31 mm, or 18 mm depending on products in Type2, about 19 mm in Type4, about 19 mm iii Type4 small, about 15 mm or 16 mm depending on products in TypeB, and about 30 mm in TypeF according to the NFC reader mode test result.

When the gap interval GW between the top magnetic sheet 120 and the bottom magnetic sheet 130 is about 9 mm, the combo antenna module 100 has recognition distances that are about 32 mm in Type1, about 41 mm, 32 mm, or 18 min depending on products in Type2, about 19 mm in Type4, about 19 mm in Type4 small, about 15 mm or 16 mm depending on products in TypeB, and about 30 mm in Type1; according to the NFC reader mode test result.

When the gap interval GW between the top magnetic sheet 120 and the bottom magnetic sheet 130 is about 11 ram, the combo antenna module 100 has recognition distances that are about 33 mm in Type1, about 40 mm, 32 mm, or 18 mm depending on products in Type2, about 19 mm in Type4, about 19 mm in Type4 about 15 mm depending on products in TypeB, and about 30 mm in TypeF according to the NFC reader mode test result.

As described above, the combo antenna module 100 according to the first embodiment of the present disclosure firms the gap interval GW (the gap region GA) between the top magnetic sheet 120 and the bottom magnetic sheet 130, so that it is possible to improve the recognition distance in the reader mode of the NFC frequency band in the small portable device.

The combo antenna module 100 according to a second embodiment of the present disclosure prevents noise from being generated in the connector cable by the magnetic field generated upon wireless power transmission and prevents the flicker occurrence of the display due to the noise of the connector cable by expanding the magnetic sheet configured to shield the radiation pattern to shield the connector cable.

To this end, referring to FIG. 18, the combo antenna module 100 according to the second embodiment of the present disclosure is configured to include the antenna sheet 110 on which a plurality of radiation patterns are formed, the top magnetic sheet 120 disposed on the upper surface of the antenna sheet. 110, the bottom magnetic sheet 130 disposed on the lower surface of the antenna sheet 110, and the expansion magnetic sheet 140 disposed on the upper surface of the top magnetic sheet 120. Hereinafter, in describing the combo antenna module 100 according to the second embodiment, a detailed description of the same configuration and structure as those of the combo antenna module 100 according to the first embodiment will be omitted.

The top magnetic sheet 120 is disposed on the upper surface of the antenna sheet 110. The top magnetic sheet 120 is disposed adjacent to the first side S11 of the base sheet 111. The top magnetic sheet 120 is disposed in regions overlapping the first radiation pattern 112 and the second radiation pattern 113. Referring to FIG. 19, the top magnetic sheet 120 may be divided into the first base region 121 and the first projecting region 122.

The first base region 121 is disposed adjacent to the first side S11 of the base sheet 111. The first base region 121 includes the first side S21 facing the bottom magnetic sheet 130, the second side S22 opposite to the first side S21 and disposed adjacent to the first side S21 of the base sheet 111, the third side S23 connected to one end of the first side S21 and one end of the second side S22, and the fourth side S24 connected to the other end of the first side S21 and the other end of the second side S22.

The first projecting region 122 extends from the first side S21 of the first base region 121. The first projecting region 122 extends from the first side S21 of the first base region 121 toward the second side S12 of the base sheet 111.

A partial region of the first projecting region 122 disposed in a direction opposite to the first base region 121 overlaps the bottom magnetic sheet 130. At this time, the first projecting region 122 has the partial region extending toward the second side S12 of the base sheet 111 overlapping the bottom magnetic sheet 130 with the antenna sheet 110 interposed therebetween.

The width of the first projecting region 122 is smaller than the width of the first base region 121 (i.e., the shortest distance between the third side S23 and the fourth side S24 of the first base region 121). Accordingly, the first side part S21' of the first base region 121 faces the bottom magnetic sheet 130 at both sides of the first projecting region 122 and is spaced apart from the bottom magnetic sheet 130 by a set interval or more.

The bottom magnetic sheet 130 is disposed on the lower surface of the antenna sheet 110. At this time, the bottom magnetic sheet 130 is disposed adjacent to the second side S12 of the base sheet 111 opposite to the first side S11 of the base sheet 111. The bottom magnetic sheet 130 is disposed in a region overlapping the third radiation pattern 114.

Referring to FIG. 20, the bottom magnetic sheet 130 has the recess 132 formed on one side facing the top magnetic sheet 120. The recess 132 is formed to have a shape corresponding to the first radiation pattern 112 so that the bottom magnetic sheet 130 does not overlap the first radiation pattern 112.

The recess 132 is formed to have a width smaller than that of one side of the bottom magnetic sheet 130 facing the top magnetic sheet 120. Accordingly, the bottom magnetic sheet 130 faces the top magnetic sheet 120 at both sides of the recess 132. At this time, the bottom magnetic sheet 130 is spaced apart from the first side part S21' of the first base region 121 of the top magnetic sheet 120 by the set range or more.

Referring to FIG. 21, the bottom magnetic sheet 130 may be divided into a first main region 134, a first expansion region 136, and a second expansion region 138.

The first main region 134 is a region of the entire region of the bottom magnetic sheet 130, which overlaps the antenna sheet 110. The above-described recess 132 is formed in the first main region 134.

The first expansion region 136 refers to a region of the entire region of the bottom magnetic sheet 130 from one side of the first main region 134 to the first side S31. In other words, the first expansion region 136 is a region disposed to extend in an outward direction of a line overlapping the fourth side S14 of the antenna sheet.

The second expansion region 138 refers to a region of the entire region of the bottom magnetic sheet 130 from the other side of the first main region 134 to the second side S32. In other words, the second expansion region 136 is a region disposed to extend in an outward direction of a line overlapping the third side S13 of the antenna sheet.

When the first expansion region 136 and the second expansion region 138 are mounted on the portable device, at least a part thereof overlaps the connector cable. The first expansion region 136 and the second expansion region 138 prevent noise from being generated in the connector cable due to the magnetic field by blocking the magnetic field generated from the radiation patterns.

For example, the first expansion region 136 and the second expansion region 138 overlap the connector cable such as an FRC cable or a C2C cable connecting the main board and the display. The first expansion region 136 and the second expansion region 138 prevents noise in the connector cable by blocking the magnetic field generated from the first radiation pattern upon wireless power transmission. Accordingly, the combo antenna module 100 may prevent the flickering phenomenon of the display due to the noise generation of the connector cable.

The expansion agnetic sheet 140 is disposed adjacent to the first side S11 of the base sheet 111. The expansion magnetic sheet 140 is disposed in the region overlapping the first radiation pattern 112 and the second radiation pattern 113.

The expansion magnetic sheet 140 is disposed above the top magnetic sheet 120, The top magnetic sheet 120 is interposed between the expansion magnetic sheet 140 and the antenna sheet 110. In other words, the top magnetic sheet 120 is disposed on the upper surface of the antenna sheet 110, and the expansion magnetic sheet 140 is disposed on the upper surface of the top magnetic sheet 140. Accordingly, the top magnetic sheet 120 is interposed between the antenna sheet 110 and the expansion magnetic sheet 140.

Referring to FIG. 22, the expansion magnetic sheet 140 may also be disposed above the antenna sheet 110. The second top magnetic sheet 140 is interposed between the antenna sheet 110 and the top magnetic sheet 120. In other words, the expansion magnetic sheet 140 is disposed on the upper surface of the antenna sheet 110, and the top magnetic sheet 120 is disposed on the upper surface of the expansion magnetic sheet 140. Accordingly, the expansion magnetic sheet 140 is interposed between the antenna sheet 110 and the top magnetic sheet 120.

Referring to FIG. 23, the expansion magnetic sheet 140 may be divided into a second base region 141 and a second projecting region 142.

The second base region 141 is disposed adjacent to the first side S11 of the base sheet 111. The second base region 141 includes a first side S41 facing the bottom magnetic sheet 130, a second side S42 opposite to the first side S41 and disposed adjacent to the second side S12 of the base sheet 111, a third side S33 connected to one end of the first side S41 and one end of the second side S42, and a fourth side S44 connected to the other end of the first side S41 and the other end of the second side S42.

The second projecting region 142 extends from the first side S41 of the second base region 141. The second projecting region 142 extends from the first side S41 of the second base region 141 toward the second side S12 of the base sheet 111.

A partial region of the second projecting region 142 disposed in a direction opposite to the second base region 141 overlaps the bottom magnetic sheet 130. At this time, the second projecting region 142 has the partial region extending toward the second side S12 of the base sheet 111 overlapping the bottom magnetic sheet 130 with the antenna sheet 110 interposed therebetween.

The width of the second projecting region 142 is smaller than the width of the second base region 141 (i.e., the shortest distance between the third side S43 and the fourth side S44 of the second base region 141), Accordingly, a first side part S41' of the second base region 141 faces the bottom magnetic sheet 130 at both sides of the second projecting region 142 and is spaced apart from the bottom magnetic sheet 130 by a set interval or more.

The second projecting region 142 overlaps the first projecting region 121 of the top magnetic sheet 120. In other words, when the expansion magnetic sheet 140 is disposed on the upper surface of the top magnetic sheet 120, the second projecting region 142 is disposed on the upper surface of the first projecting region 121 to overlap the first projecting region 121. When the expansion magnetic sheet 140 is disposed on the lower surface of the top magnetic sheet 120, the second projecting region 142 is disposed on the lower surface of the first projecting region 121 to overlap the first projecting region 121.

Meanwhile, referring to FIG. 24, the second base region 141 may be divided into a second main region 143, a third expansion region 144, and a fourth expansion region 145.

The second main region 143 is a region of the second base region 141, which overlaps the antenna sheet 110 and the top magnetic sheet 120.

The third expansion region 144 is a region from the outer circumference of the second main region 143 to a part of the second side S42 and the third side S43 of the second base region 141. The third expansion region 144 is a region that does not overlap the antenna sheet 110 and is disposed outside in the directions of the first side S11 and the fourth side S14 of the antenna sheet 110.

The fourth expansion region 145 is a region from the outer circumference of the second main region 143 to a part of the second side S42 and the fourth side S44 of the second base region 141. The fourth expansion region 145 is a region that does not overlap the antenna sheet 110 and is disposed outside in the directions of the first side S11 and the third side S13 of the antenna sheet 110.

At least a part of the third expansion region 144 and the fourth expansion region 145 overlaps with the connector cable when mounted on the portable device. The third expansion region 144 and the fourth expansion region 145 prevent noise from being generated in the connector cable due to the magnetic field by blocking the magnetic field generated by the radiation patterns.

For example, the third expansion region 144 and the fourth expansion region 145 overlap the connector cable such as an FRC cable and a C2C cable connecting the main board and the display. The third expansion region 144 and the fourth expansion region 145 prevent noise in the connector cable by blocking the magnetic field generated from the first radiation pattern upon wireless power transmission. Accordingly, the combo antenna module 100 may prevent the flickering phenomenon of the display due to the noise generation of the connector cable.

Referring to FIG. 25, the top magnetic sheet 120 and the bottom magnetic sheet 130 overlap each other at a part of the third radiation pattern 114, and are spaced apart from each other to have a first gap interval GW1 within a set range at both sides of the overlapped region to form a first gap region GA1.

The first gap interval GW1 between the top magnetic sheet 120 and the bottom magnetic sheet 130 may be adjusted within the se range according to the antenna characteristics required by the portable device.

When a current is applied to the radiation patterns in a state where the first gap interval GW1 between the top magnetic sheet 120 and the bottom magnetic sheet 130 exceeds the maximum value of the set range, the magnetic fields formed in the radiation patterns become strong and thus affect the parts in the portable device.

For example, noise is generated in a connector cable connecting a display of the portable device and a main board due to the magnetic field generated from the first radiation pattern 112 upon wireless power transmission, and a flicker phenomenon may occur in the display due to the noise of the connector cable.

As another example, the magnetic field generated from the second radiation pattern 113 is required to pass through the top magnetic sheet 120 to move in the upward direction of the combo antenna module 100, and when the first gap interval GW1 between the top magnetic sheet 120 and the bottom magnetic sheet 130 exceeds the maximum value of the set range, the magnetic field may not flow well in the upward direction of the combo antenna module 100 to cause loss, thereby degrading the antenna performance (e.g., MST communication performance) of the second radiation pattern 113.

Meanwhile, when a current is applied to the radiation patterns in a state where the first gap interval GW1 between the top magnetic sheet 120 and the bottom magnetic sheet 130 is less than the minimum value of the set range, the first gap interval GW1 between the top magnetic sheet 120 and the bottom magnetic sheet 130 is in a narrow state, so that the magnetic fields formed in the radiation patterns may not pass through the first gap interval GW1 and are stagnated, thereby degrading the antenna performance.

For example, the magnetic fields generated from the second radiation pattern 113 and the third radiation pattern 114 may not smoothly pass through the first gap interval GW1 between the top magnetic sheet 120 and the bottom magnetic sheet 130 and are stagnated, thereby degrading short-range communication performance.

In other words, the magnetic field generated from the second radiation pattern 113 is required to pass through the top magnetic sheet 120 to move in the upward direction of the combo antenna module 100, and when the gap interval GW1 between the top magnetic sheet 120 and the bottom magnetic sheet 130 is less than the minimum value of the set range, the magnetic field of the second radiation pattern 113 on the lower portion of the combo antenna module 100 may not be sufficiently formed due to the stagnation of the magnetic field, thereby degrading the antenna performance (e.g., MST communication performance) of the second radiation pattern 113.

Accordingly, the first gap interval GW1 between the top magnetic sheet 120 and the bottom magnetic sheet 130 is formed to have an interval within the se range according to the antenna characteristics required by the portable device.

At this time, the set range is, for example, 2 mm or more and 8 mm or less. The set range may be set to a relative length with the antenna sheet 110, and in this case, may be set to 5% or more and 20% or less of the length of the antenna sheet 110. Here, the length of the antenna sheet 110 is the length of the region where the radiation pattern is formed in the antenna sheet 110, and is, for example, the shortest distance between the first side S11 and the second side S12 of the base sheet 111, and when the length of the antenna sheet is about 38 mm, the set range may be about 1.9 mm or more and 7.6 mm or less.

The set range may be set to a relative length with the base sheet ill, and in this case, may be set to 5% or more and 20% or less of the length of the base sheet 111. Here, the length of the base sheet 111 may be a length in a direction orthogonal to the first side S11 and the second side S12, and when the length of the base sheet is about 38 mm, the set range is about 1.9 mm or more and 7.6 mm or less.

The top magnetic sheet 120 and the bottom magnetic sheet 130 may be formed to have the same first gap interval GW1 at both sides of the first projecting region 122 or the recess 132. In other words, in the top magnetic sheet 120 and the bottom magnetic sheet 130 may be disposed so that the first gap interval GW1 of the direction of the third side S13 of the base sheet 111 is the same as the first gap interval GW1 of the direction of the fourth side S14.

Referring to FIG. 26, the bottom magnetic sheet 130 and the expansion magnetic sheet 140 overlap each other at a part of the third radiation pattern 114 and are spaced apart from each other to have a second gap interval GW2 within the set range at both sides of the overlapped region to form a second gap region GA2. At this time, the first expansion region 136 of the bottom magnetic sheet 130 faces the third expansion region 144 of the expansion magnetic sheet 140 in a state of being spaced apart by the second gap interval GW2. The second expansion region 138 of the bottom magnetic sheet 130 faces the fourth expansion region 145 of the expansion magnetic sheet 140 in a state of being spaced apart by the second gap interval GW2.

The second gap interval GW2 between the bottom magnetic sheet 130 and the expansion magnetic sheet 140 may be adjusted within the set range according to the antenna characteristics required by the portable device.

When a current is applied to the radiation patterns in a state in which the second gap interval GW2 between the bottom magnetic sheet 130 and the expansion magnetic sheet 140 exceeds the maximum value of the set range, the magnetic fields formed in the radiation patterns become strong and thus affect the parts in the portable device.

For example, noise is generated in a connector cable connecting a display of the portable device and a main board due to the magnetic field generated from the first radiation pattern 112 upon wireless power transmission, and a flicker phenomenon may occur in the display due to the noise of the connector cable.

As another example, the magnetic field generated from the second radiation pattern 113 is required to pass through the expansion magnetic sheet 140 to move in the upward direction of the combo antenna module 100, and when the second gap interval GW2 between the bottom magnetic sheet 130 and the expansion magnetic sheet 140 exceeds the maximum value of the set range, the magnetic field may not flow well in the upward direction of the combo antenna module 100 to cause loss, thereby degrading the antenna performance (e.g., MST communication performance) of the second radiation pattern 113.

Meanwhile, when a current is applied to the radiation patterns in a state where the second gap interval GW2 between the bottom magnetic sheet 130 and the expansion magnetic sheet 140 is less than the minimum value of the set range, the second gap interval GW2 between the bottom magnetic sheet 130 and the expansion magnetic sheet 140 is narrow, so that the magnetic fields formed from the radiation patterns may not pass through the second gap interval GW2 and are stagnated, thereby degrading the antenna performance.

For example, the magnetic fields generated from the second radiation pattern 113 and the third radiation pattern 114 may not smoothly pass through the second gap interval GW2 between the bottom magnetic sheet 130 and the expansion magnetic sheet 140 and are stagnated, thereby degrading the short-range communication performance.

In other words, the magnetic field generated from the second radiation pattern 113 is required to pass through the expansion magnetic sheet 140 to move in the upward direction of the combo antenna module 100, and when the second gap interval GW2 between the bottom magnetic sheet 130 and the expansion magnetic sheet 140 is less than the minimum value of the set range, the magnetic field of the second radiation pattern 113 may not be sufficiently formed on the lower portion of the combo antenna module 100 due to the stagnation of the magnetic field, thereby degrading the antenna performance (e.g., MST communication performance) of the second radiation pattern 113.

Accordingly, the second gap interval GW2 between the bottom magnetic sheet 130 and the expansion magnetic sheet 140 is formed to have an interval within the set range according to the antenna characteristics required by the portable device.

At this time, the set range is, for example, 2 mm or more and 8 mm or less. The set range may be set to a relative length with the antenna sheet 110, and in this case, mar be set to 5% or more and 20% or less of the length of the antenna sheet 110. Here, the length of the antenna sheet 110 is the length of the region where the radiation pattern is formed in the antenna sheet 110, and is, for example, the shortest distance between the first side S11 and the second side S12 of the base sheet 111.

The set range may be set to a relative length with the base sheet 111, and in this case, may be set to 5% or more and 20% or less of the length of the base sheet 111. Here, the length of the antenna sheet 110 (or the length of the base sheet 111) may be a length in a direction perpendicular to the first side S11 and the second side S12.

The bottom magnetic sheet 130 and the expansion magnetic sheet 140 may be formed to have the same second gap interval GW2 at both sides of the first projecting region 122 or the recess 132, in other words, the bottom magnetic sheet 130 and the expansion magnetic sheet 140 may be disposed so that the second gap interval GW2 in the direction of the third side S13 of the base sheet 111 is the same as the second gap interval GW2 in the direction of the fourth side S14 of the base sheet 111.

Meanwhile, for example, the second gap interval GW2 is the same interval as the first gap interval GW1 that is the interval between the top magnetic sheet 120 and the bottom magnetic sheet 130. The first gap interval GW1 and the second gap interval GW2 may be within the set range and at the same time, may also be different from each other.

Referring to FIG. 27, one of the plurality of radiation patterns included in the antenna sheet 110 is exposed through the first gap region GA1 between the top magnetic sheet 120 and the bottom magnetic sheet 130 and/or the first gap region GA1 between the bottom magnetic sheet 130 and the expansion magnetic sheet 140.

In other words, the first refraction portion R1 and the second refraction portion R2 positioned in the regions facing the second radiation pattern 113 among the first refraction portion R1 to the fourth refraction portion R4 of the third radiation pattern 114 are exposed through the first gap region GA1 and/or the second gap region GA2.

Accordingly, the combo antenna module 100 may improve the antenna performance (i.e., MST performance)

of the third radiation pattern 114 by increasing the intensity of the magnetic field generated from the third radiation pattern 114.

Meanwhile, when the third radiation pattern 114 is not exposed through the first gap region GA1 and/or the second gap region GA2, the combo antenna module 100 has the reduced intensity of the magnetic field generated from the third radiation pattern 114, thereby degrading the antenna performance (i.e., MST performance) of the third radiation pattern 114.

Accordingly, the combo antenna module 100 is configured so that a part of the third radiation pattern 114 is exposed through the first gap region GA1 and/or the second gap region GA2.

Referring to FIGS. 28 and 29, in the conventional portable device, the connector cable 12 and the display module 13 are disposed above the battery 11. At this time, since the magnetic sheet 16 and the battery 11 of the combo antenna module shield the magnetic field, the connector cable 12 is not affected by the TX magnetic field generated from the wireless power transmission module 20 upon wireless power transmission.

Recently, as the thickness of the portable device gets smaller, the capacity of the battery 11 increases and thus the size gets larger, so that the connector cable 12 is mainly disposed under the battery 11. The magnetic sheet 16 of the combo antenna module overlaps only the antenna sheet 17, and the battery 11 is disposed at a lower end of the connector cable 12.

Accordingly, the connector cable 12 is exposed toward the wireless power transmission module 20 as it is, and affected by the TX magnetic field generated from the wireless power transmission module 20 during wireless power transmission to cause noise. Various problems occur in the display module 13 due to the noise of the connector cable 12. For example, when the connector cable 12 is a cable configured to connect the display module 13 such as FRC or C2C and the main circuit, the flicker phenomenon occurs in the display module 13 due to the noise generated in the connector cable 12.

Accordingly, referring to FIGS. 30 and 31, the portable device according to the second embodiment of the present disclosure expands the top magnetic sheets 120 and 140 of the combo antenna module 100 to be disposed above a connector cable 220 (i.e., toward the wireless power transmission module 20).

The portable device includes a battery 210, a display module 230 disposed above the battery 210, the connector cable 220 disposed under the battery 210, and the combo antenna module 100 disposed under the battery 210.

The combo antenna module 100 is disposed under the battery 210 and includes the top magnetic sheet 120, the bottom magnetic sheet 130, and the expansion magnetic sheet 140, which have the expansion region.

At this time, as the expansion magnetic sheet 140 is disposed on the upper surface of the top magnetic sheet 120, the expansion magnetic sheet 140 is bent in the expansion regions in the mounting process of the combo antenna module 100 and is disposed under the connector cable 220.

As the combo antenna module 100 is mounted, the first expansion region 136 and the second expansion region 138 of the bottom magnetic sheet 130 and the third expansion region 144 and the fourth expansion region 145 of the expansion magnetic sheet 140 among the magnetic sheets of the combo antenna module 100 are disposed above the connector cable 220.

The top magnetic sheet 120 of the combo antenna module 100 is disposed on the upper surface of the antenna sheet 110 to shield only the antenna sheet 110 region, and the expansion magnetic sheet 140 is disposed on the upper surface of the top magnetic sheet 120 to shield the regions of the antenna sheet 110 and the connector cable 220.

Accordingly, the expansion regions disposed under the connector cable 220 shield the TX magnetic field generated during wireless power transmission, and the noise due to the TX magnetic field is not generated in the connector cable 220.

Meanwhile, referring to FIG. 32, the expansion magnetic sheet 140 may be interposed between the top magnetic sheet 120 and the antenna sheet 110. In other words, the top magnetic sheet 120 is mounted on the lower surface of the battery 210 and interposed between the two connector cables 220. The expansion magnetic sheet 140 is interposed between the top magnetic sheet 120 and the antenna sheet 110 and disposed under the connector cables 220 in a state of being not bent in the mounting process.

As described above, the portable device according to the second embodiment of the present disclosure expands the magnetic sheet of the combo antenna module 100 and disposes the expanded sheet under the connector cable 220, so that it is possible to prevent noise from being generated in the connector cable 220 by the TX magnetic field generated during wireless power transmission.

In addition, the portable device according to the second embodiment of the present disclosure expands the magnetic sheet of the combo antenna module 100 and disposes the expanded sheet under the connector cable 220 to prevent noise from being generated in the connector cable 220 by the TX magnetic field generated during wireless power transmission, so that it is possible to prevent the flicker phenomenon or the like occurring due to the noise of the connector cable 220.

FIG. 33 shows the results of testing the MST antenna performance of the portable device having the combo antenna module according to the second embodiment of the present disclosure.

First, describing the MST antenna performance test environment, the portable device and the reader on which the combo antenna module 100 is mounted are center-aligned, and the portable device is disposed to be spaced apart from the upper portion of the reader by about 2 cm. While the portable device is moved by 1 cm with respect to the X and Y axes, whether the MST communication between the portable device and the reader is successful is tested. At this time, the MST antenna performance test is performed on the total area of the portable device, and the ratio of the MST communication success region to the total area is defined as the recognition rate.

When the portable device includes the combo antenna module that does not include the expansion magnetic sheet 140 having the expansion region and is disposed so that the top magnetic sheet 120 and the bottom magnetic sheet 130 have the gap interval GW within the set range, the portable device has a recognition rate of about 50.33% according to the MST antenna performance test result.

When the portable device includes the combo antenna module that includes the expansion magnetic sheet 140 having the expansion region and is disposed so that the top magnetic sheet 120 and the bottom magnetic sheet 130 have the gap interval GW within the set range, the portable device has a recognition rate of about 54.90% according to the MST antenna performance test result.

As described above, as the combo antenna module 100 disposes the expansion magnetic sheet 140 having the expansion region on the upper surface or the lower surface of the top magnetic sheet 120, the portable device prevents the noise generation of the connector cable and improves the MST communication performance of the portable device.

FIG. 34 shows the performance test result of the NFC antenna operating in the card mode. Here, FIG. 34 is a test result for ACM1252, which is a type of an NFC reader, and a load modulation shows the result that the ACM1252 was tested in a state of disposing the portable device (i.e., an interval between the portable device and the reader) at heights of 0 cm, 1 cm, 2 cm, and 3 cm.

When the portable device includes the combo antenna module that does not include the expansion magnetic sheet 140 having the expansion region and is disposed so that the top magnetic sheet 120 and the bottom magnetic sheet 130 have the gap interval GW within the set range, the portable device has a recognition distance of about 68 mm according to the NFC card mode test result.

When the portable device includes the combo antenna module that includes the expansion magnetic sheet 140 having the expansion region and is disposed so that the top magnetic sheet 120 and the bottom magnetic sheet 130 have the gap interval GW within the set range, the portable device has a recognition distance of about 70 mm according to the NFC card mode test result.

As described above, as the portable device having the combo antenna module according to the second embodiment of the present disclosure disposes the expansion magnetic sheet 140 having the expansion region on the upper surface or the lower surface of the top magnetic sheet 120, the portable device may prevent the noise generation in the connector cable and satisfy the recognition distance characteristic of the MST frequency band required by the portable device even when the size of the portable device gets smaller.

The portable device includes the combo antenna module that does not include the expansion magnetic sheet 140 having the expansion region and is disposed so that the top magnetic sheet 120 and the bottom magnetic sheet 130 have the gap interval GW within the set range. When the portable device is disposed above the reader without the gap, the portable device has the load modulation characteristic of about 37.55 mV, which exceeds the reference value of 8.8 mV. When the portable device is spaced apart from the upper portion of the reader by about 1 cm; the portable device has the load modulation characteristic of about 20.59 mV, which exceeds the reference value of 7.2 mV. When the portable device is spaced apart from the upper portion of the reader by about 2 cm, the portable device has the load modulation characteristic of about 24.11 mV, which exceeds the reference value of 5.6 mV, When the portable device is spaced apart from the upper portion of the reader by about 3 cm, the portable device has the load modulation characteristic of about 23.62 mV; which exceeds the reference value of 4.0 mV. Next, the portable device includes the combo antenna module that includes the expansion magnetic sheet 140 and is disposed so that the expansion magnetic sheet 140 and the bottom magnetic sheet 130 have the gap interval GW within the set range.

When the portable device is disposed above the reader without the gap, the portable device has the load modulation characteristic of about 38.69 mV, which exceeds the reference value of 8.8 mV. When the portable device is spaced apart from the upper portion of the reader by about 1 cm, the portable device has the load modulation characteristic of about 20.83 mV, which exceeds the reference value of 7.2 mV. When the portable device is spaced apart from the upper portion of the reader by about 2 cm, the portable device has the load modulation characteristic of about 25.19 mV, which exceeds the reference value of 5.6 mV. When the portable device is spaced apart from the upper portion of the reader by about 3 cm, the portable device has the load modulation characteristic of about 23.86 mV, which exceeds the reference value of 4.0 mV.

As described above, the portable device having the combo antenna module according to the second embodiment of the present disclosure forms the gap interval between the bottom magnetic sheet and the expansion magnetic sheet and expands the expansion magnetic sheet, so that it is possible to prevent the noise generation of the connector cable and satisfy the recognition distance of the NFC frequency band and the load modulation characteristic required by the portable device even when the size of the portable device gets smaller.

FIG. 35 shows the results of testing the recognition distance of the NFC antenna operating in a reader mode. Here, in FIG. 35, Type1, Type2, Type4, Type4 TypeB, and TypeF are standard names defined in the NFC forum, and Topaz, Ultra-light, NTAG203, ULC, Desfire EV1, TecTiles, NETS Flash, Process_16.0, and OCTOPUS thereunder are commercial tags that operate with the corresponding Type, respectively.

When the portable device includes the combo antenna module that does not include the expansion magnetic sheet 140 having the expansion region and is disposed so that the top magnetic sheet 120 and the bottom magnetic sheet 130 have the gap interval GW within the set range, the portable device has recognition distances that are about 33 mm in Type1, about 41 mm, 32 mm, or 18 mm depending on products in Type2, about 19 mm in Type4, about 19 mm in Type4 small, about 15 mm or 16 mm depending on products in TypeB, and about 30 mm in TypeF according to the NFC reader mode test result.

When the portable device includes the combo antenna module that does not include the expansion magnetic sheet 140 having the expansion region and is disposed so that the top magnetic sheet 120 and the bottom magnetic sheet 130 have the gap interval GW within the set range, the portable device has recognition distances that are about 34 mm in Type1, about 42 mm, 35 min, or 20 mm depending on products in Type 2, about 21 mm in Type4, about 21 mm in Type4 small, about 15 mm or 17 mm depending on products in TypeB, and about 31 mm in TypeF according to the NFC reader mode test result.

As described above, the portable device having the combo antenna module according to the second embodiment of the present disclosure forms the gap interval between the bottom magnetic sheet and the expansion magnetic sheet and expands the expansion magnetic sheet, so that the portable device may prevent the noise generation of the connector cable and satisfy the recognition distance characteristic of the NFC reader mode required by the portable device even when the size of the portable device gets smaller.

Meanwhile, referring to FIGS. 36 and 37, the wireless power transmission module 20 forms the TX magnetic field in the process of performing wireless power for wireless charging of the portable device.

The TX magnetic field is mostly shielded by the magnetic sheets of the combo antenna module 100. In the combo antenna module 100 according to the second embodiment of the present disclosure, the connector cable 220 is exposed toward the wireless power transmission module 20 through the gap region GA2 between the expansion magnetic sheet 140 and the bottom magnetic sheet 130. Here, the exposure means that the magnetic field (electromagnetic waves) is not shielded.

Accordingly, a part of the TX magnetic field is introduced into the connector cable 220 through the gap region GA2. The minute noise is generated in the connector cable 220 due to the introduced TX magnetic field, and in the display module, the flicker phenomenon occurs finely due to the minute noise generated from the connector cable 220.

Accordingly, a combo antenna module and a portable device including the same according to a third embodiment of the present disclosure block the introduction of the TX magnetic field through the gap region GA2 by disposing a metal sheet 150, thereby preventing the fine flickering phenomenon of the display module.

Referring to FIG. 38, the combo antenna module 100 according to the third embodiment of the present disclosure is configured to include the antenna sheet 110 on which the plurality of radiation patterns are formed, the top magnetic sheet 120 disposed on the upper surface of the antenna sheet 110, the bottom magnetic sheet 130 disposed on the lower surface of the antenna sheet 110, the expansion magnetic sheet 140 disposed on the upper surface of the top magnetic sheet 120, and the metal sheet 150 disposed on the upper surface of the expansion magnetic sheet 140. Here, since the antenna sheet 110, the top magnetic sheet 120, the bottom magnetic sheet 130, and the expansion magnetic sheet 140 are the same as those of the above-described second embodiment, the same reference numerals are denoted by the above components, and overlapping descriptions will be omitted.

The metal sheet 150 is a conductive sheet, and for example, the thin metal sheet 150 made of copper (Cu). Any material of the metal sheet 150 may be used as long as it is a conductive material capable of blocking (shielding) electromagnetic waves (magnetic fields) in addition to copper.

However, electromagnetic waves (magnetic fields) flow through the magnetic material and thus the magnetic material may affect the antenna performance of the radiation patterns, so that it is preferable that the metal sheet 150 is made of a non-magnetic material.

The metal sheet 150 is disposed on the upper surface of the expansion magnetic sheet 140 to block the introduction of electromagnetic waves. In other words, the metal sheet 150 blocks the introduction of the TX magnetic field generated from the wireless power transmission module 20 upon wireless power transmission.

Here, referring to FIGS. 39 and 40, the area of the metal sheet 150 may be formed to be larger than the area of the expansion magnetic sheet 140 to overlap the total area of the expansion magnetic sheet 140 and overlap a part of the bottom magnetic sheet 130. The metal sheet 150 may overlap a part of the expanded magnetic sheet 140 and overlap the entire bottom magnetic sheet 130. At this time, the metal sheet 150 is essentially disposed in the gap region GA2 between the expansion magnetic sheet 140 and the bottom magnetic sheet 130.

Here, a plurality of metal sheets 150 may be separately formed to be disposed in the gap regions GA2 between the expansion magnetic sheet 140 and the bottom magnetic sheet 130, respectively. However, the metal sheet 150 is composed of one sheet to facilitate the manufacturing and assembly processes.

Referring to FIG. 41, the combo antenna module 100 is disposed below the battery when mounted on the portable device. Accordingly, the metal sheet 150 is interposed between the battery and the expansion magnetic sheet 140, and between the connector cable 220 and the expansion magnetic sheet 140. At this time, the metal sheet 150 may be bent at a position where a stepped portion is formed between the battery and the connector cable 220 in the process of mourning the combo antenna module 100 on the portable device.

Referring to FIG. 42, the metal sheet 150 is disposed in the gap regions GA2 between the expansion magnetic sheet 140 and the bottom magnetic sheet 130 to prevent the magnetic fields (electromagnetic waves) from being introduced into the connector cable 220. In other words, the metal sheet 150 is disposed in the gap region GA2 to block (shield) the minute TX magnetic field introduced into the connector cable 220 through the gap region GA2.

Accordingly, the portable device having the combo antenna module 100 prevents the generation of the minute noise of the connector cable 220 and prevents the minute flicker phenomenon of the display module accordingly. Meanwhile, the metal sheet 150 may absorb and radiate heat generated from the combo antenna module 100 in addition to shielding the electromagnetic waves.

FIG. 43 shows the results of testing the MST antenna performance of the portable device having the combo antenna module 100 according to the third embodiment of the present disclosure.

First, describing the MST antenna performance test environment, the portable device and the reader on which the combo antenna module 100 is mounted are center-aligned, and the portable device is disposed to be spaced apart from the upper portion of the reader by about 2 cm. While the portable device is moved by 1 cm with respect to the X and Y axes, whether the MST communication between the portable device and the reader is successful is tested. At this time, the MST antenna performance test is performed on the total area of the portable device, and the ratio of the MST communication success region to the total area is defined as the recognition rate.

As the result of the MST antenna performance test, the portable devices having the combo antenna module 100 of the second embodiment of the present disclosure have a recognition rate of about 54.90%, and the portable devices having the combo antenna module 100 of the third embodiment of the present disclosure has a recognition rate of about 54.90%.

As described above, the combo antenna module according to the third embodiment of the present disclosure and the portable device including the same dispose the metal sheet 150 in the gap region GA2 between the expansion magnetic sheet 140 and the bottom magnetic sheet 130, so that it is possible to prevent the fine noise generation of the connector cable 220 to improve the minute flicker phenomenon of the display module and maintain the MST antenna performance at the same level as that of the combo antenna module according to the second embodiment of the present disclosure and the portable device including the same, FIG. 44 shows the performance test result of the NFC antenna operating in the card mode. Here, FIG. 44 is a test result for ACM1252, which is a type of an NEC reader, and a load modulation shows the result that the ACM 1252 was tested in a state of disposing a height of the portable device (i.e., an interval between the portable device and the reader) at 0 cm, 1 cm, 2 cm, and 3 cm.

As the result of the NFC card mode test, the portable device having the combo antenna module 100 according to the second embodiment of the present disclosure has a recognition distance of about 70 mm, and the portable device having the combo antenna module 100 according to the third embodiment of the present disclosure has a recognition distance of about 70 mm.

As described above, the combo antenna module according to the third embodiment of the present disclosure and the portable device including the same dispose the metal sheet 150 in the gap region GA2 between the expansion magnetic sheet 140 and the bottom magnetic sheet 130, so that it is possible to prevent the fine noise generation of the connector cable 220 to improve the minute flicker phenomenon of the display module and maintain the recognition distance performance of the NFC antenna at the same level as that of the combo antenna module according to the second embodiment and the portable device including the same.

In addition, the combo antenna module according to the third embodiment of the present disclosure and the portable device including the same perform the measurement at the same level as in the combo antenna module according to the second embodiment and the portable device including the same even in the load modulation test result and satisfy the load modulation standard required by the portable device in all test items.

In addition, referring to FIG. 45, the combo antenna module according to the third embodiment of the present disclosure and the portable device having the same perform the measurement at the same level as in the combo antenna module according to the second embodiment and the portable device including the same even in the NFC reader mode recognition distance test result and satisfy the recognition distance standard required by the portable device in all test items.

While the preferred embodiments of the present disclosure have been described above, the present disclosure may be modified in various forms, and those skilled in the art will understand that various modified examples and changed examples may be carried out without departing from the claims of the present disclosure.

The invention claimed is:

1. A combo antenna module comprising:
an antenna sheet on which a plurality of radiation patterns are formed;
a top magnetic sheet disposed on an upper surface of the antenna sheet, and disposed adjacent to a first side of the antenna sheet;
a bottom magnetic sheet disposed on a lower surface of the antenna sheet, and disposed adjacent to a second side of the antenna sheet opposite to the first side of the antenna sheet; and
an expansion magnetic sheet disposed on an upper surface of one of the top magnetic sheet and the antenna sheet, and disposed adjacent to the first side of the antenna sheet,
wherein the top magnetic sheet includes a first projecting region overlapping the bottom magnetic sheet with the antenna sheet interposed therebetween, and the top magnetic sheet and the bottom magnetic sheet are spaced apart from each other to have a gap interval within a set range at a side portion of the first projecting region, and
wherein the expansion magnetic sheet includes one or more expansion regions extending from an outer circumference of a region overlapping the antenna sheet and disposed outside the antenna sheet.

2. The combo antenna module of claim 1,
wherein the top magnetic sheet further includes a base region disposed adjacent to the first side of the antenna sheet,
the first projecting region is connected to one side of the base region, and extends toward to the second side of the antenna sheet, and
the base region has one side, to which the first projecting region is connected, spaced apart from the bottom magnetic sheet by a set interval or more at both sides of the projecting region.

3. The combo antenna module of claim 1,
wherein the bottom magnetic sheet has a recess formed at one side facing the top magnetic sheet, and is spaced apart from the top magnetic sheet by a set interval or more at both sides of the recess.

4. The combo antenna module of claim 1,
wherein the top magnetic sheet and the bottom magnetic sheet are spaced apart from each other at both sides of the first projecting region, and a first gap interval at one side of the first projecting region and a second gap interval at the other side of the first projecting region are the same as each other.

5. The combo antenna module of claim 1,
wherein the set range is 5% or more and 20% or less of a length of the antenna sheet, and a length of the antenna sheet is a length in a direction orthogonal to the first and second sides of the antenna sheet.

6. The combo antenna module of claim 1,
wherein one radiation pattern of the plurality of radiation patterns is exposed through a gap region between the top magnetic sheet and the bottom magnetic sheet.

7. The combo antenna module of claim 1,
wherein the expansion magnetic sheet is divided into
a base region disposed above the antenna sheet, and
a second projecting region extending from one side among the plurality of sides configuring the base region, which faces the bottom magnetic sheet, toward the second side of the antenna sheet to partially overlap the bottom magnetic sheet.

8. The combo antenna module of claim 7,
wherein the base region is divided into
a main region overlapping the antenna sheet, and
an expansion region extending from at least one side among the plurality of sides configuring the base region in an outward direction.

9. The combo antenna module of claim 8,
wherein the expansion region is spaced apart from the bottom magnetic sheet to have a gap interval within the set range at a side portion of the second projecting region.

10. The combo antenna module of claim 7,
wherein the second projecting region of the expansion magnetic sheet overlaps the first projecting region of the top magnetic sheet.

11. The combo antenna module of claim 1, further including: a metal sheet disposed on an upper surface of the expansion magnetic sheet and disposed a gap region between the bottom magnetic sheet and the expansion magnetic sheet.

12. The combo antenna module of claim 11,
wherein the metal sheet overlaps a part of the bottom magnetic sheet and the expansion magnetic sheet.

* * * * *